United States Patent
Vandyke et al.

(10) Patent No.: US 11,999,490 B2
(45) Date of Patent: Jun. 4, 2024

(54) AIR CURTAIN SYSTEMS AND METHODS FOR VEHICLE CABINS

(71) Applicant: THE BOEING COMPANY, Chicago, IL (US)

(72) Inventors: Bryce Avery Vandyke, Snohomish, WA (US); Douglas Dean Maben, Snohomish, WA (US); Jonathan William Collins, Bonney Lake, WA (US); Tateh Wu, Bellevue, WA (US); Anders Michael Pedersen, Snohomish, WA (US); Edmund Fidelino P. Cordero, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 358 days.

(21) Appl. No.: 17/335,572

(22) Filed: Jun. 1, 2021

(65) Prior Publication Data

US 2022/0063814 A1    Mar. 3, 2022

Related U.S. Application Data

(60) Provisional application No. 63/071,594, filed on Aug. 28, 2020.

(51) Int. Cl.
  *B64D 13/00*   (2006.01)
  *B60J 9/04*   (2006.01)

(52) U.S. Cl.
  CPC .............. *B64D 13/00* (2013.01); *B60J 9/04* (2013.01); *B64D 2013/003* (2013.01)

(58) Field of Classification Search
  CPC ....... B64D 13/00; B64D 2013/003; B60J 9/04

USPC .......................................................... 454/69
  See application file for complete search history.

(56) References Cited

U.S. PATENT DOCUMENTS

| | | | | |
|---|---|---|---|---|
| 3,527,152 A | * | 9/1970 | McGowan | B60H 1/00371 454/95 |
| 4,819,548 A | * | 4/1989 | Horstman | B64D 13/00 454/76 |
| 4,896,588 A | * | 1/1990 | Monda | F24F 11/75 181/258 |

(Continued)

FOREIGN PATENT DOCUMENTS

| DE | 29613434 U1 | 9/1996 |
|---|---|---|
| DE | 102010012882 B3 | 7/2011 |

(Continued)

OTHER PUBLICATIONS

Extended European Search Report received for related European Patent Application No. 21191981.6 dated Jan. 24, 2022 (8 pages).

*Primary Examiner* — Avinash A Savani
*Assistant Examiner* — Dana K Tighe
(74) *Attorney, Agent, or Firm* — The Small Patent Law Group LLC; Philip S. Hof

(57) ABSTRACT

A system includes an outflow vent that has a cap releasably mounted to a panel within an internal cabin of a vehicle. The cap is elongated from a first end of the cap to a second end of the cap opposite the first end. The cap has a base wall that is overlaid on the panel and defines at least one slot therethrough. The cap receives an airflow generated by an airflow generator, and the at least one slot emits the airflow from the cap to form an air curtain within the internal cabin.

20 Claims, 28 Drawing Sheets

(56) References Cited

U.S. PATENT DOCUMENTS

| | | | | |
|---|---|---|---|---|
| 5,765,635 A * | 6/1998 | Rhee | ............... | B60H 1/00742 |
| | | | | 454/189 |
| 8,702,481 B1 * | 4/2014 | Wilbourn | ............ | B60H 1/243 |
| | | | | 454/96 |
| 10,449,844 B2 * | 10/2019 | Le Bastard | ............ | B61D 19/02 |
| 2015/0063995 A1 * | 3/2015 | Rivera | ............... | B64D 13/06 |
| | | | | 415/207 |
| 2020/0140093 A1 | 5/2020 | Vandyke et al. | | |
| 2021/0387737 A1 * | 12/2021 | Harcup | ............... | B64D 13/00 |

FOREIGN PATENT DOCUMENTS

| | | |
|---|---|---|
| EP | 1217317 A2 | 6/2002 |
| EP | 2335954 A1 | 6/2011 |
| EP | 3090948 A1 | 11/2016 |
| KR | 101921975 B1 | 11/2018 |

\* cited by examiner

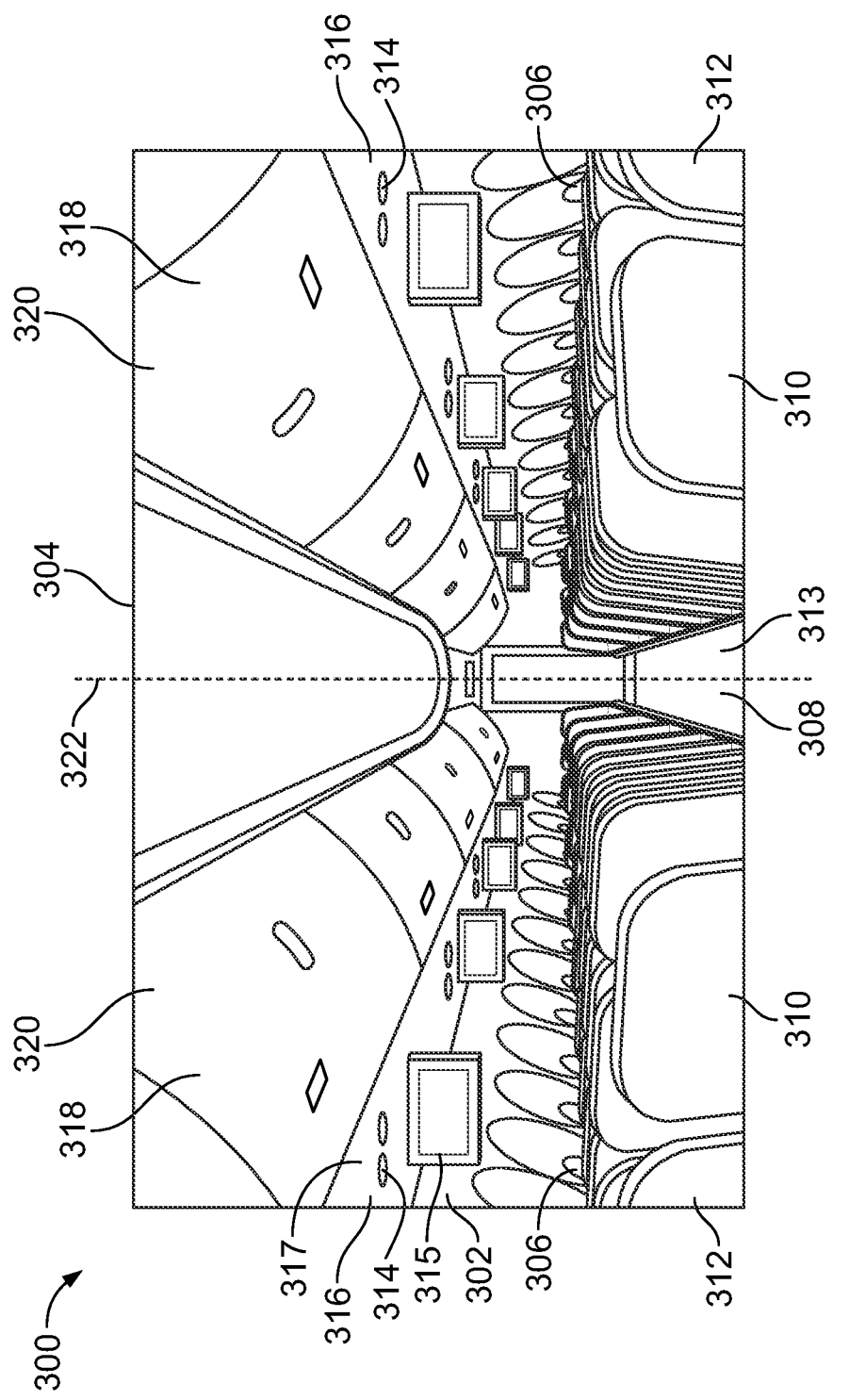

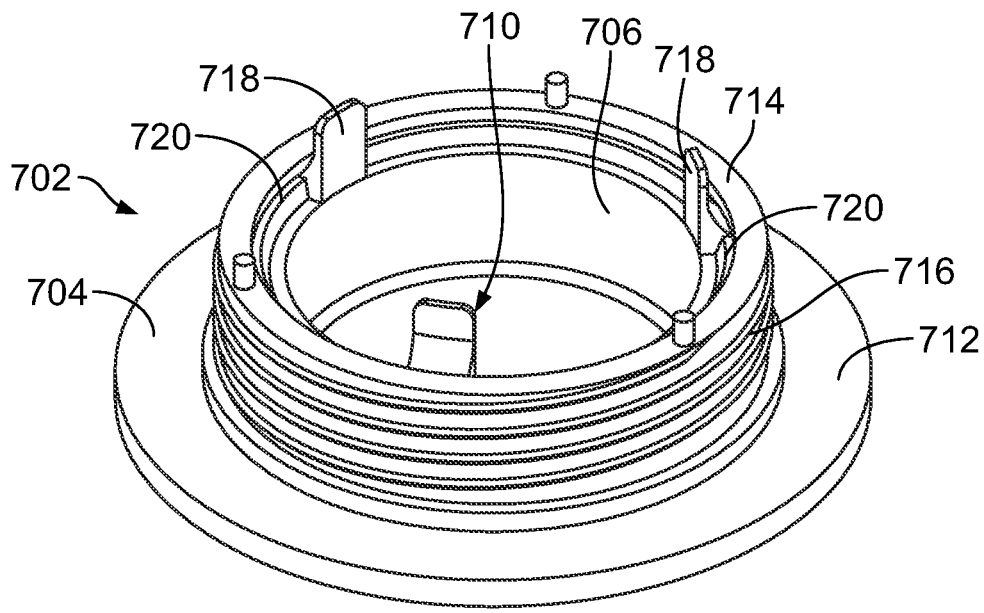
FIG. 19
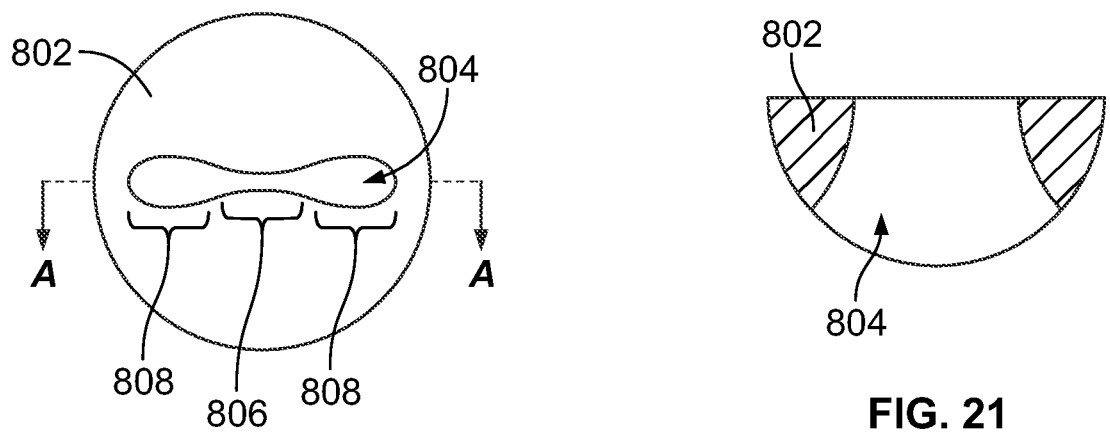
FIG. 20
FIG. 21

AIR CURTAIN SYSTEMS AND METHODS FOR VEHICLE CABINS

CROSS-REFERENCE TO RELATED APPLICATIONS

This application relates to and claims priority benefits from U.S. Provisional Application No. 63/071,594, entitled "Air Curtain Systems and Methods for Internal Cabins of Vehicles," filed Aug. 28, 2020, which is hereby incorporated by reference in its entirety.

FIELD OF THE DISCLOSURE

Embodiments of the present disclosure generally relate to air curtain systems and methods, such as may be used within internal cabins of vehicles.

BACKGROUND OF THE DISCLOSURE

Commercial vehicles, such as aircraft, are used to transport passengers between various locations. Some commercial vehicles have HEPA filters in the air conditioning system that are able to entrap microbes and pathogens. The HEPA filters receive and clean air that exits an internal cabin or is about to enter the internal cabin. The use of HEPA filters as well as frequent cleaning of the cabin between trips are some methods to ensure the health of the passengers and crew onboard the vehicle. Further, certain passengers may prefer to wear masks within the internal cabin of the vehicle in order to reduce the risk of spreading pathogens.

SUMMARY OF THE DISCLOSURE

A need exists for a system and a method for inhibiting the spread of pathogens within an enclosed space, such as onboard an internal cabin of a vehicle during a trip.

With that need in mind, certain embodiments of the present disclosure provide a system (e.g., an air curtain system) that includes an outflow vent. The outflow vent has a cap releasably mounted to a panel within an internal cabin of a vehicle. The cap is elongated from a first end of the cap to a second end of the cap opposite the first end. The cap has a base wall that is overlaid on the panel and defines at least one slot therethrough. The cap receives an airflow generated by an airflow generator, and the at least one slot emits the airflow from the cap to form an air curtain within the internal cabin.

Certain embodiments provide a vehicle that includes an internal cabin and an air curtain system. The internal cabin includes a row of seats and a panel disposed above the row of seats. The air curtain system is within the internal cabin. The air curtain system includes an outflow vent having a cap releasably mounted to the panel above the row of seats. The cap has a base wall that is overlaid on the panel and defines at least one slot therethrough. The cap receives an airflow generated by an airflow generator, and the at least one slot emits the airflow from the cap to form an air curtain associated with the row of seats below.

Certain embodiments provide a system (e.g., an air curtain system) that includes a rail and an outflow vent. The rail is operatively connected to an airflow generator of a vehicle, and defines a channel that conveys airflow from the airflow generator. The outflow vent includes a cap releasably mounted to a panel within the vehicle. The cap has a base wall that is overlaid on the panel and defines at least one slot therethrough. The cap defines a cavity between the panel and the base wall. A first end of the cap defines an inlet opening, and the first end is coupled to the rail such that the inlet opening is fluidly connected to the channel of the rail. The cap receives the airflow from the rail within the cavity, and the cap emits the airflow through the at least one slot to form an air curtain within the internal cabin.

BRIEF DESCRIPTION OF THE DRAWINGS

FIG. 5 illustrates a perspective interior view of an internal cabin of an aircraft, according to an embodiment of the present disclosure.

FIG. 19 is an upper perspective view of the nozzle shown in FIGS. 17 and 18.

FIG. 20 is a plan view of a cover of a nozzle according to an embodiment.

FIG. 21 is a cross-sectional view of the cover taken along line A-A in FIG. 20.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide an air curtain system and method within an internal cabin of a vehicle. The air curtain system is configured to generate an air curtain between seats and/or rows within the internal cabin to provide a more controlled airspace. The phrase or term "air curtain" is intended to mean a controlled air stream that is formed to have an elongated, three-dimensional shape. The air curtain is facilitated or generated by the systems described herein. For example, the air curtain may be formed via one or more elongated slots through a nozzle or cap, and the shape of the air curtain may substantially mimic the two-dimensional shape of the slot(s). The air curtain may have an air velocity that is different than a surrounding air velocity to generate a curtain-like sensation of air in a target area. The air curtain may effectively be a continuous air stream formed to resemble a panel or sheet. The air curtain is invisible in one embodiment. Alternatively, an additive such as a colorant or smoke may be added to the air stream to render the air curtain visible.

Figure 1:
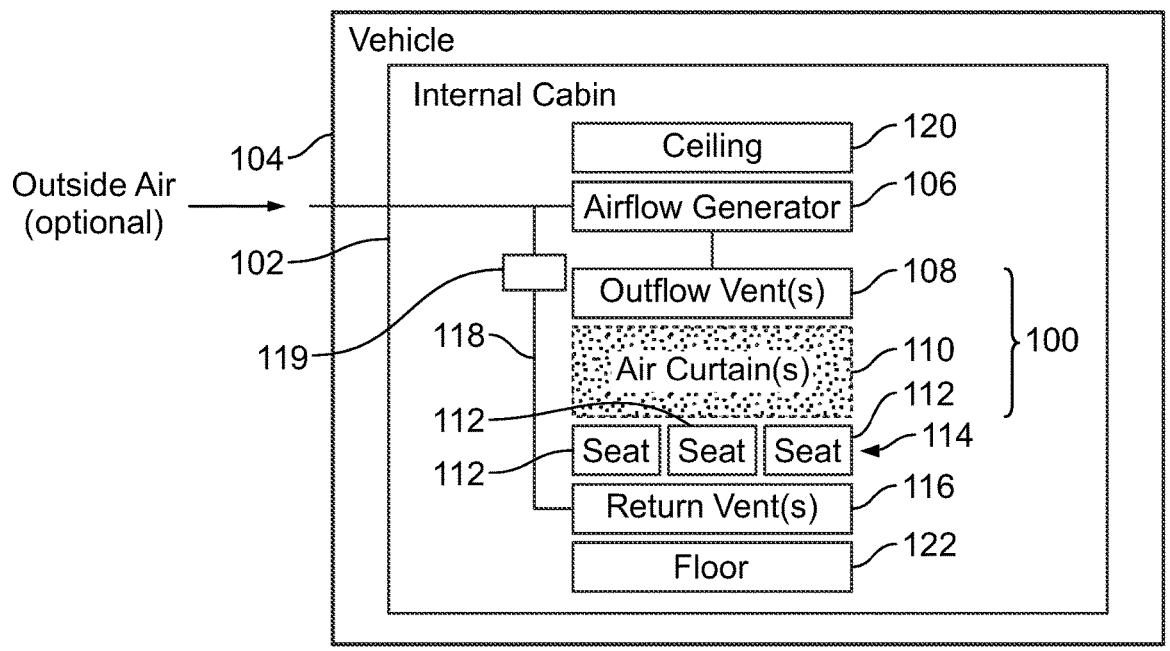
FIG. 1 illustrates a schematic block diagram of an air curtain system within an internal cabin of a vehicle, according to an embodiment of the present disclosure.
Figure 2:
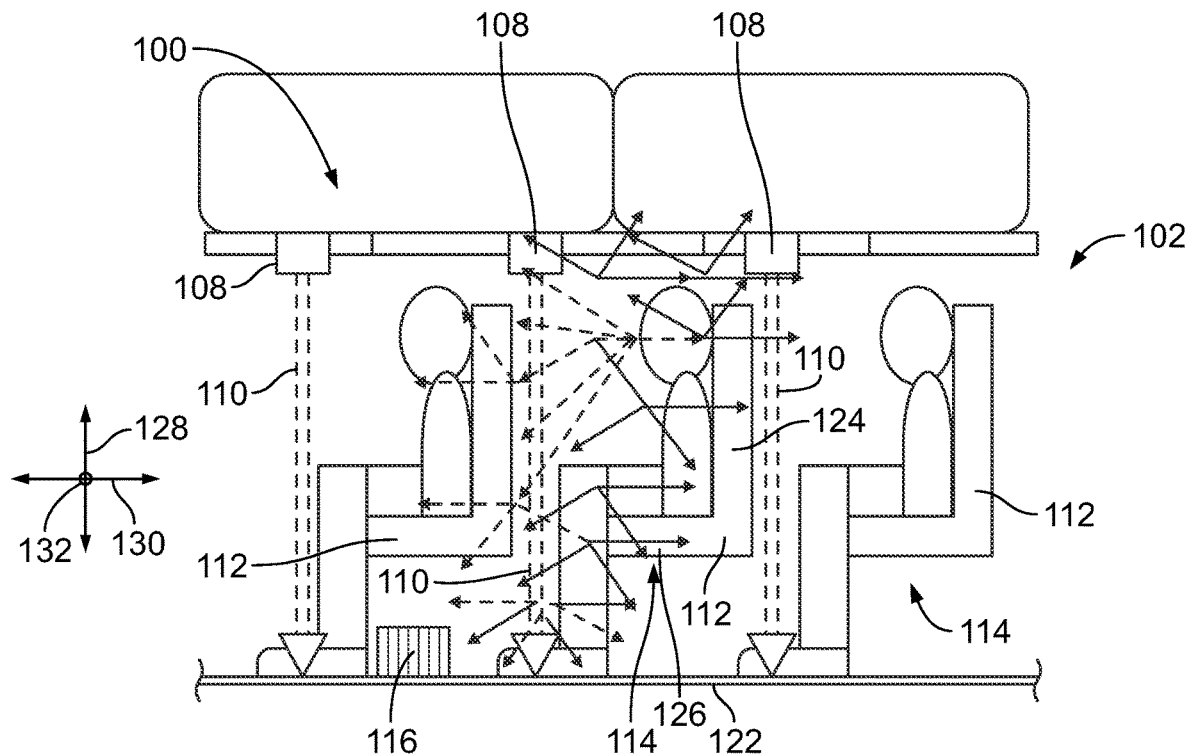
FIG. 2 illustrates a side view of an air curtain system within an internal cabin of a vehicle, according to an embodiment of the present disclosure.

FIG. 1 illustrates a schematic block diagram of an air curtain system 100 within an internal cabin 102 of a vehicle 104, according to an embodiment of the present disclosure. FIG. 2 illustrates a side view of the air curtain system 100 within the internal cabin 102 of the vehicle 104 shown in FIG. 1, according to an embodiment of the present disclosure. The air curtain system 100 may be integrated with a ventilation system of the vehicle 104. For example, the air curtain system 100 may receive airflow generated by an airflow generator 106 of the vehicle 104. The air curtain system 100 includes one or more outflow vents 108 through which the airflow generated by the airflow generator 106 is directed and emitted. The airflow that is generated by the airflow generator 106 is an actively-produced stream of air, as opposed to air flows that naturally occur within a confined space due to moving bodies, etc. The outflow vents 108 include one or more nozzles that are configured to form the airflow from the airflow generator 106 into an air curtain 110 of the air curtain system 100. The outflow vent(s) 108 direct the air curtain 110 between rows 114 of seats 112 and/or between seats 112 in the same row 114. The air curtain 110 that is output through the outflow vents 108 passes between the seats 112 and/or the rows 114 and is received by one or more return vents 116 (including one or more registers, or other such intakes). The return vents 116 direct the airflow back to the airflow generator 106 and/or to a different destination via one or more conduits 118, such as ducts. Optionally, a filter 119 may be disposed within the conduits to entrap airborne particles, such as pollen, dust, dirt, bacteria, viruses, liquid aerosols, moisture, and/or the like. The filter 119 may be a HEPA filter.

The nozzles may be sized and shaped to cover a single seat 112 or a row 114 of seats 112. For example, an outflow vent 108 in the form of an elongated nozzle that extends over a group of seats 112 may be used. As another example, an outflow vent 108 having a nozzle that extends over only one seat 112 may be used. The outflow vents 108 are sized and shaped to provide a desired size and/or shape of the air curtain 110. In at least one embodiment, the outflow vents 108 may include one or more slits or slots that are configured to shape the air curtain 110. The outflow vents 108 may be integrated within one or more passenger service units (PSUs) above the seats 112. As another example, the outflow vents 108 may be secured in the ceiling 120 above the seats 112.

The airflow generator 106 may include a blower, fan, vacuum device, and/or the like. The airflow generator 106 is secured within the internal cabin 102. For example, the airflow generator 106 may be disposed above a ceiling 120, behind a wall, within a compartment, and/or the like. The airflow generator 106 may be a component of a main air supply system (e.g., ventilation system) of the vehicle 104. For example, the generator 106 may be a component of an environmental control system (ECS) (e.g. a heating and air conditioning system) onboard the vehicle 104 that conditions the air that is supplied to the internal cabin 102. The airflow generator 106 may receive air from outside of the vehicle and/or recycled air that is returned through the conduit 118 from the return vent(s) 116. The main air supply system and/or the airflow generator 106 may include one or more air filters for filtering the airflow, such as HEPA filters, before passing through the outflow vents 108 and/or upon returning through the return vent(s) 116.

The return vents 116 are configured to receive and catch the air curtain 110 output by the outflow vents 108 to facilitate returning the airflow of the air curtain 110 back to the airflow generator 106. The return vents 116 may be disposed below the seats 112, such as proximate to, on, and/or within a floor 122 that supports the seats 112. The conduit(s) 118 may be routed underneath the floor 122 and/or behind walls to the airflow generator 106. Based on the positioning of the outflow vents 108 and the return vents 116, the air curtain 110 may be directed from above the seats 112 to below the seats 112, as shown in FIG. 2. Alternatively, the air curtain system 100 may not include the return vents 116.

Referring to FIG. 2, the air curtains 110 are formed to restrict transmission of pathogens between people within the internal cabin 102. The air curtains 110 provide barriers of flowing air that prevent or otherwise reduces air passage between the seats 112 and/or the rows 114. The air curtains capture and divert bioaerosols. In at least one embodiment, the air curtain 110 is generated between the rows 114 so that forward and aft air flow therebetween is reduced. For example, the air curtains 110 may capture and entrain particles or bioaerosols (which may include pathogens) emitted from a seated passenger when breathing, talking, and/or coughing. The entrainment would capture the bioaerosols and carry the bioaerosols downward towards the return vents 116. In addition to capturing the bioaerosols emitted from the seated passenger, the air curtain 110 can also function as a shield in front of the seated passenger that blocks external airborne contaminants and pathogens from entering the breathing space of the seated passenger.

In the illustrated embodiment, at least one respective outflow vent 108 is disposed between each pair of adjacent rows 114 to provide a corresponding air curtain 110 between the two adjacent rows 114. The outflow vents 108 may be located and oriented to provide the air curtains 110 in front of the corresponding rows 114 of seats 112 such that each air curtain 110 is disposed in the space between the seatback 124 of a seat 112 in a first row and the seat bottom 126 of a seat 112 in a second row behind the first row. As such, the air curtain 110 is disposed proximate to and in front of an upper body (e.g., head and torso) of the passenger seated in the second row to provide the entrapment of bioaerosols emitted by the passenger and bioaerosols emitted by other people prior to being breathed by the passenger.

The outflow vents 108 may form the air curtains 110 to be three-dimensional with lengths in a first and second dimension being significantly greater than a length in the third dimension. The first, second, and third dimensions are mutually perpendicular. For example, the air curtains 110 may have a height along a vertical axis 128 of the internal cabin 102. The height of the air curtains 110 may extend from the outflow vents 108 to the floor 122 and/or the return vents 116. The air curtains 110 have a thickness along a longitudinal axis 130 that extends the length of the internal cabin 102. The thickness of the air curtains 110 is significantly less than the height. The air curtains 110 have a width along a lateral axis 132 of the internal cabin 102, which extends parallel to the rows of seats. For example, the seats in each row may be arranged in a line along a respective row axis which is parallel to the lateral axis 132. The width of the air curtains 110 may be significantly greater than the thickness, like the height. For example, the width of each air curtain 110 may extend across multiple seats 112 in the same row 114. The air curtains 110 are elongated parallel to a row axis of the respective row 114, such that the air curtains 110 form sheets or walls of air between the rows 114. The air curtains 110 may be relatively planar, as indicated in FIG. 2. Alternatively, the outflow vents 108 may form the air curtains 110 to have a contour or curve, such as to at least partially curve around one or more passengers seated in a given row 114.

In at least one embodiment, the air curtain(s) 110 may be continuously generated. As another example, the air curtain(s) 110 may be selectively activated and deactivated manually via a user interface in communication with a control unit, and/or automatically via the control unit.

Figure 3:
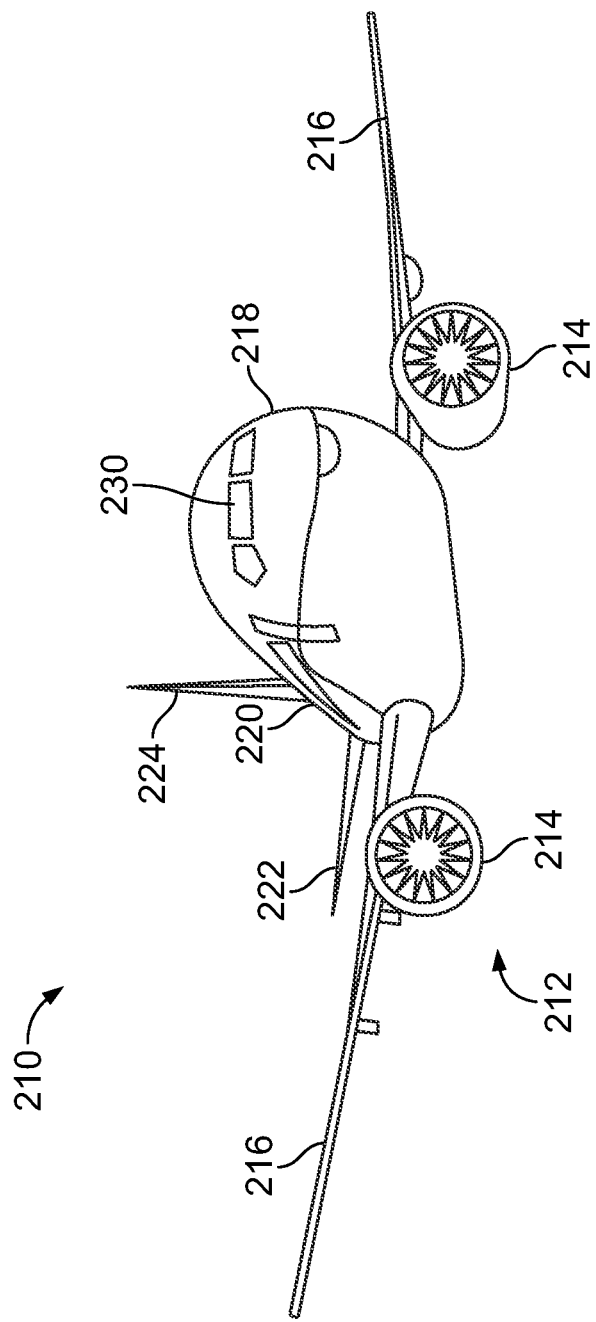
FIG. 3 illustrates a perspective front view of an aircraft, according to an embodiment of the present disclosure.

FIG. 3 illustrates a perspective front view of an aircraft 210, according to an embodiment of the present disclosure. The aircraft 210 is an example of the vehicle 104 shown in FIG. 1. The aircraft 210 includes a propulsion system 212 that includes engines 214, for example. Optionally, the propulsion system 212 may include more engines 14 than shown. The engines 214 are carried by wings 216 of the aircraft 210. In other embodiments, the engines 214 may be carried by a fuselage 218 and/or an empennage 220. The empennage 220 may also support horizontal stabilizers 222 and a vertical stabilizer 224.

The fuselage 218 of the aircraft 210 defines an internal cabin 230 (such as the internal cabin 102 shown in FIG. 1), which includes a flight deck or cockpit, one or more work sections (for example, galleys, personnel carry-on baggage areas, and the like), one or more passenger sections (for example, first class, business class, and coach sections), one or more lavatories, and/or the like.

Alternatively, instead of an aircraft, embodiments of the present disclosure may be used with various other vehicles, such as automobiles, buses, locomotives and train cars, watercraft, spacecraft, and the like. Further, embodiments of the present disclosure may be used with respect to fixed structures, such as commercial and residential buildings.

Figure 4A:
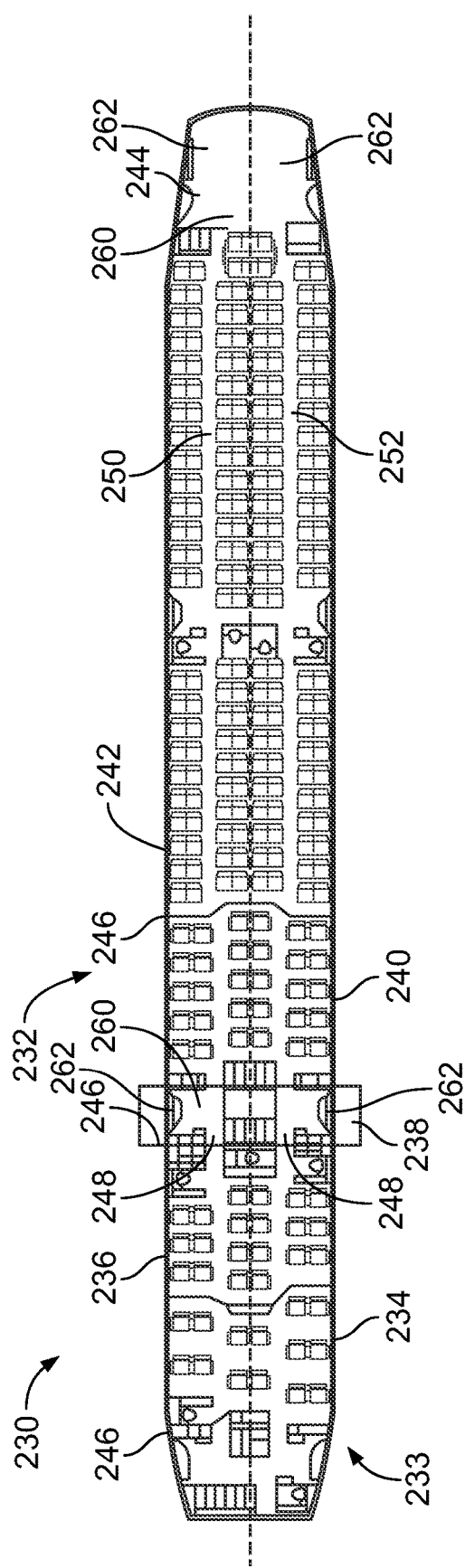
FIG. 4A illustrates a top plan view of an internal cabin of an aircraft, according to an embodiment of the present disclosure.

FIG. 4A illustrates a top plan view of an internal cabin 230 of an aircraft, according to an embodiment of the present disclosure. The internal cabin 230 may be within the fuselage 232 of the aircraft, such as the fuselage 218 of FIG. 3. For example, one or more fuselage walls may define the internal cabin 230. The internal cabin 230 includes multiple sections, including a front section 233, a first class section 234, a business class section 236, a front galley station 238, an expanded economy or coach section 240, a standard economy of coach section 242, and an aft section 244, which may include multiple lavatories and galley stations. It is to be understood that the internal cabin 230 may include more or less sections than shown. For example, the internal cabin 230 may not include a first class section, and may include more or less galley stations than shown. Each of the sections may be separated by a cabin transition area 246, which may include class divider assemblies between aisles 248.

As shown in FIG. 4A, the internal cabin 230 includes two aisles 250 and 252 that lead to the aft section 244. Optionally, the internal cabin 230 may have less or more aisles than shown. For example, the internal cabin 230 may include a single aisle that extends through the center of the internal cabin 230 that leads to the aft section 244.

The aisles 248, 250, and 252 extend to egress paths or door passageways 260. Exit doors 262 are located at ends of the egress paths 260. The egress paths 260 may be perpendicular to the aisles 248, 250, and 252. The internal cabin 230 may include more egress paths 260 at different locations than shown. The air curtain system 100 shown in FIGS. 1 and 2 may be used within the internal cabin 230.

Figure 4B:
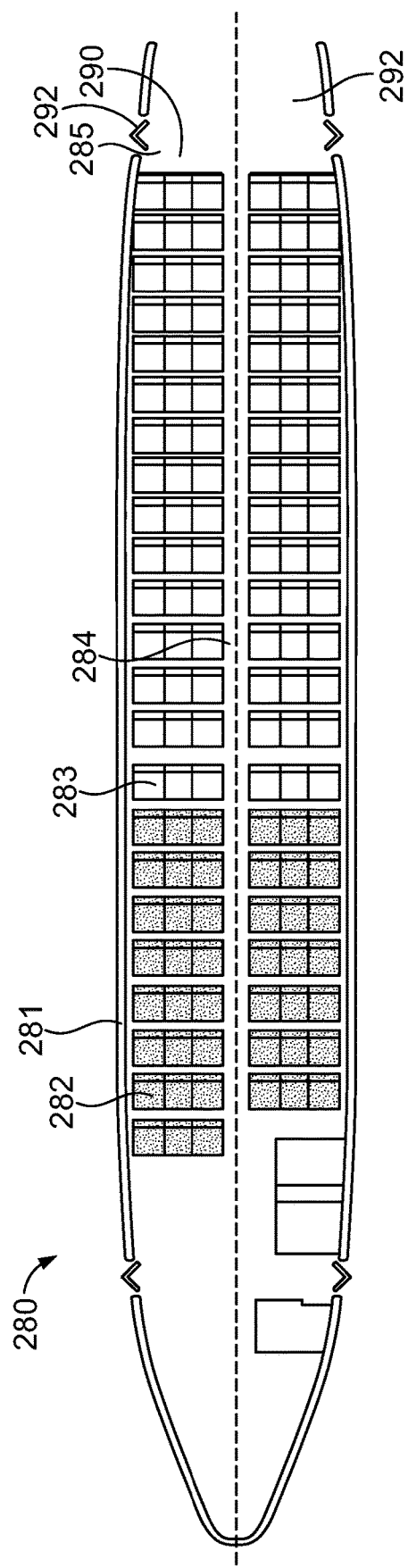
FIG. 4B illustrates a top plan view of an internal cabin of an aircraft, according to an embodiment of the present disclosure.

FIG. 4B illustrates a top plan view of an internal cabin 280 of an aircraft, according to an embodiment of the present disclosure. The internal cabin 280 is an example of the internal cabin 230 shown in FIG. 3. The internal cabin 280 may be within a fuselage 281 of the aircraft. For example, one or more fuselage walls may define the internal cabin 280. The internal cabin 280 includes multiple sections, including a main cabin 282 having passenger seats 283, and an aft section 285 behind the main cabin 282. It is to be understood that the internal cabin 280 may include more or less sections than shown.

The internal cabin 280 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280.

The aisle 284 extends to an egress path or door passageway 290. Exit doors 292 are located at ends of the egress path 290. The egress path 290 may be perpendicular to the aisle 284. The internal cabin 280 may include more egress paths than shown. The air curtain system 100 shown in FIGS. 1 and 2 may be used within the internal cabin 280.

FIG. 5 illustrates a perspective interior view of an internal cabin 300 of an aircraft, according to an embodiment of the present disclosure. The internal cabin 300 is an example of the internal cabin 102 shown in FIGS. 1 and 2. The internal cabin 300 includes outboard walls 302 connected to a ceiling 304. Windows 306 may be formed within the outboard walls 302. A floor 308 supports rows of seats 310. As shown in FIG. 5, a row 312 may include groups of three seats 310 on either side of an aisle 313. However, the row 312 may include more or less seats 310 than shown. Additionally, the internal cabin 300 may include more aisles than shown.

PSUs 314 are secured between an outboard wall 302 and the ceiling 304 on either side of the aisle 313. The PSUs 314 longitudinally extend between a front end and rear end of the internal cabin 300. For example, a corresponding PSU 314 may be positioned over first group of seats 310 within one row 312 and another PSU 314 may be positioned over a second group of seats 310 within the same row 312 on the other side of the aisle 313. A third PSU 314 may be positioned over a third group of seats 310 behind the first group of seats 310 in the next row 312. Each PSU 314 may include a housing 316 that generally contains air vents, reading lights, a drop panel for emergency equipment such as oxygen bags, an attendant call or request button, a display device 315, and/or other such controls specific for the passengers in the corresponding group of seats 310. The air vents and/or reading lights may be associated with different seats 310 in the group. For example, there may be three air vents corresponding to three seats 310, such that each air vent is specifically associated with a different seat 310. Air vents associated with individual seats are referred to herein as personal air outlets (PAOs). The housing 316 has a panel 317 that faces the seats 310 in the row 312 below. The buttons, PAOs, reading lights, or the like, may be accessible to and/or viewable by a passenger in one of the seats 310 below via designated openings in the panel 317. In the illustrated embodiment, the display devices 315 are suspended and extend below the panel 317.

In at least one embodiment, the outflow vents 108 of the air curtain system 100 connect to, or are components of, the PSUs 314. For example, the outflow vent(s) 108 of the air curtain system 100 may be retrofittable on existing PSUs 314. Each outflow vent 108 may cover one or more PAO outlet openings of the PSU 314. The outflow vent 108 can receive the air that is supplied through the one or more PAO outlet openings that the vent 108 covers, and shapes the air via a nozzle to form the air curtains 110 shown in FIGS. 1 and 2. For example, each nozzle may include one or more orifices (e.g., apertures, slots, etc.) having a predetermined shape and/or arrangement to form an air curtain 110.

Overhead stowage bin assemblies 318 are secured to the ceiling 304 and/or the outboard wall 302 above and inboard from the PSU 314 on either side of the aisle 313. The overhead stowage bin assemblies 318 are secured over the seats 310. The overhead stowage bin assemblies 318 extend between the front and rear end of the internal cabin 300. Each stowage bin assembly 318 may include a pivot bin or bucket 320 pivotally secured to a strongback. The overhead stowage bin assemblies 318 may be positioned above and inboard from lower surfaces of the PSUs 314. The overhead stowage bin assemblies 318 are configured to be pivoted open in order to receive passenger carry-on baggage and personal items, for example.

As used herein, the term "outboard" means a position that is further away from a central longitudinal plane 322 of the internal cabin 300 as compared to another component. The term "inboard" means a position that is closer to the central longitudinal plane 322 of the internal cabin 300 as compared to another component. For example, the panel 317 of the PSU 314 may be outboard in relation to the adjacent stowage bin assembly 318.

Figure 6:
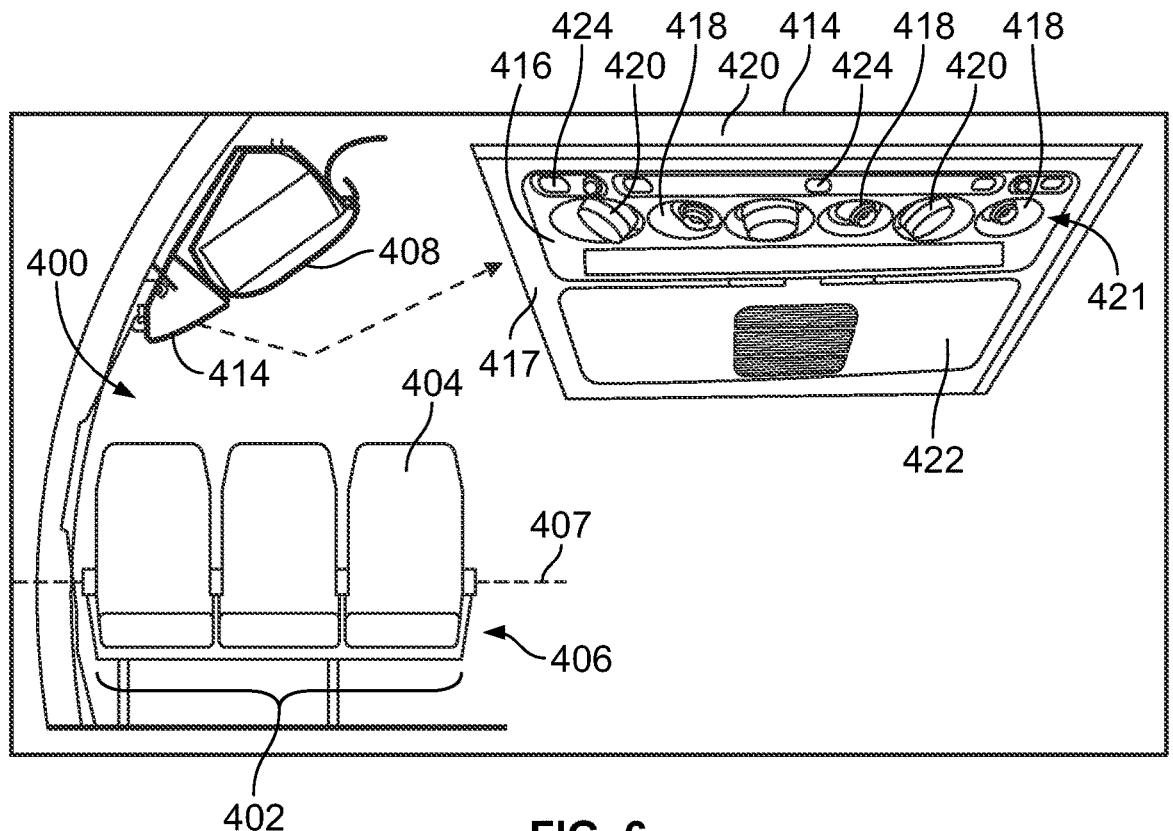
FIG. 6 illustrates a front view of a portion of an internal cabin of an aircraft and an inset perspective view of a passenger service unit (PSU) within the internal cabin, according to an embodiment of the present disclosure.

FIG. 6 illustrates a front view of a portion of an internal cabin 400 of an aircraft and an inset perspective view of a PSU 414 within the internal cabin 400, according to an embodiment of the present disclosure. The internal cabin 400 is an example of the internal cabin 102 shown in FIGS. 1 and 2, and may be similar to the internal cabin 300 shown in FIG. 5. FIG. 6 shows a first group 402 of seats 404 that are within a common row 406 on a common side of an aisle. There are three seats 404 in the first group 402. The seats 404 in each row 406 are arranged along a row axis 407. The internal cabin 400 includes both the PSU 414 and an overhead stowage bin assembly 408 above the first group 402 of seats 404. The PSU 414 is partially outboard of, and below, the overhead stowage bin assembly 408.

The PSU 414 includes a housing or structure 416 that holds multiple components including PAOs 418 and reading lights 420. The PSU 414 may include a corresponding PAO 418 and reading light 420 for each of the seats 404 in the first group 402. The PAOs 418 and reading lights 420 alternate in a row 421. The housing 416 has, or is coupled to, at least one panel 417 that includes a lower surface which faces the seats 404 below. The panel 417 is also referred to herein as a face panel 417. The PAOs 418 and the reading lights 420 are accessible and visible through openings in the panel 417. The PSU 414 also includes a drop panel 422 for emergency equipment such as oxygen bags and one or more attendant call or request buttons 424. In the illustrated embodiment, the PAOs 418 of the PSU 414 are gasper nozzles. The gasper nozzles are manually-actuatable valves for controlling the amount of air flow emitted through the outlet openings of the PAOs 418. The gasper nozzles may also be pivotable or rotatable to aim the airflow. The air emitted from the gasper nozzles is generally beam-shaped, which may spread with increasing distance from the nozzles. In at least one embodiment, the outflow vent(s) 108 of the air curtain system 100 may replace or cover the gasper nozzles.

Figure 7:
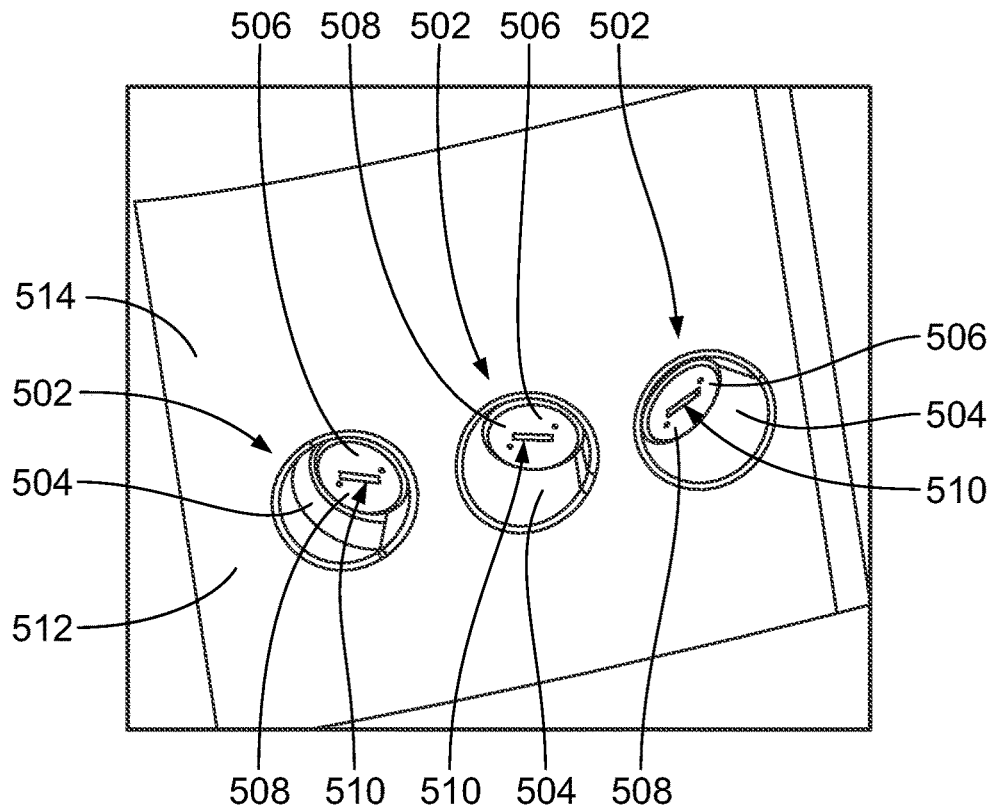
FIG. 7 illustrates multiple outflow vents of the air curtain system according to an embodiment.
Figure 8:
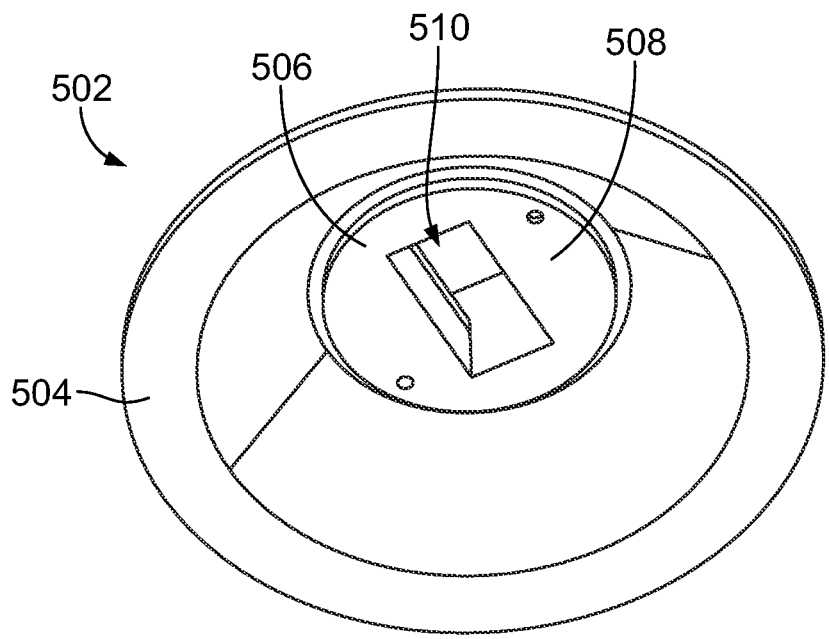
FIG. 8 is a perspective view of one of the outflow vents shown in FIG. 7 according to an embodiment.
Figure 9:
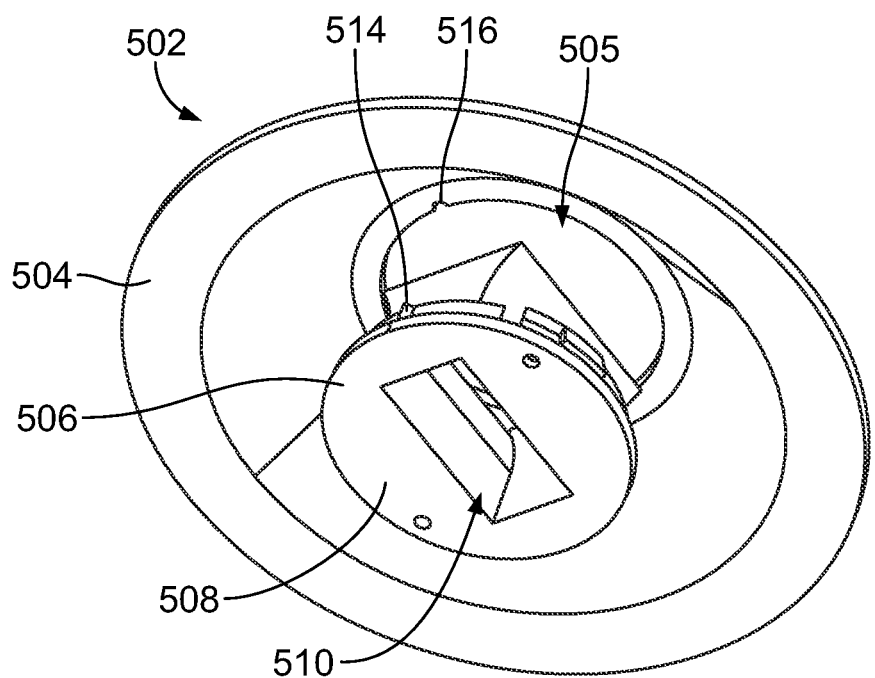
FIG. 9 is an exploded view of the outflow vent shown in FIG. 8.
Figure 10:
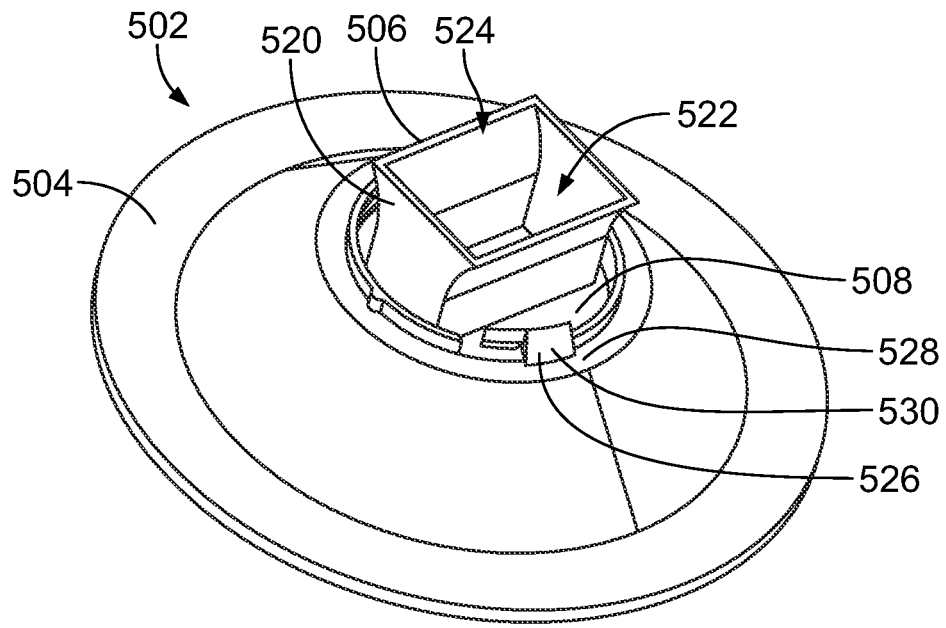
FIG. 10 is another perspective view of the outflow vent shown in FIGS. 8 and 9, showing a backside of the outflow vent that is not visible to passengers in the internal cabin.
Figure 11:
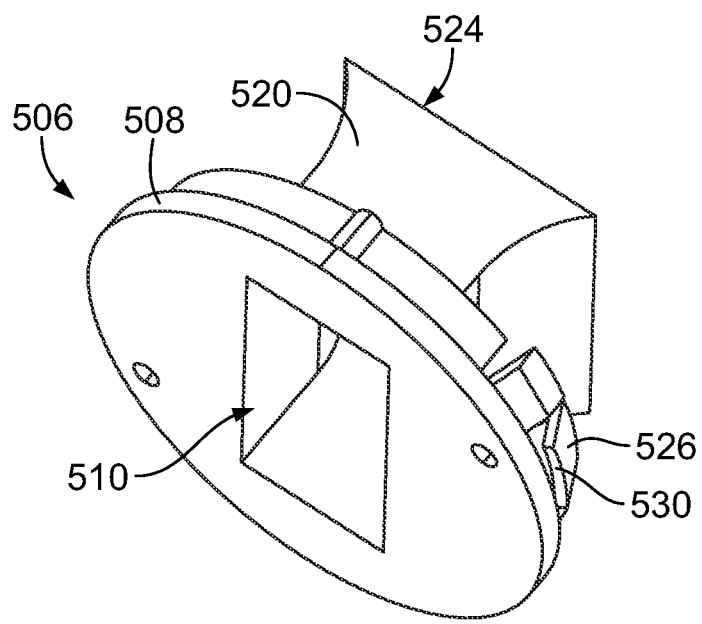
FIG. 11 is an isolated perspective view of a nozzle of the outflow vent shown in FIGS. 8 through 10.

FIG. 7 illustrates multiple outflow vents 502 of the air curtain system 100 according to an embodiment. Three outflow vents 502 are shown in FIG. 7. The outflow vents 502 are an example of the outflow vents 108 shown in FIGS. 1 and 2. Each outflow vent 502 includes a vent housing 504 that defines one or more outlet openings 505 (shown in FIG. 9). Each vent housing 504 may be associated with a different nozzle 506 (e.g., PAO). The vent housing 504 may be an integrated component of a PSU 514. For example, the vent housing 504 may be part of the PSU housing or may be coupled to the PSU housing.

Each outflow vent 502 also includes a nozzle 506 coupled to the vent housing 504 and covering one or more of the outlet openings 505. The nozzle 506 differs from a conventional PAO (e.g., gasper nozzle). The nozzle 506 includes a cover 508 that defines at least one orifice 510 therethrough. The outlet openings 505 of the housing 504 are not visible in FIG. 7 because the nozzles 506 cover the outlet openings 505. The at least one orifice 510 has a predetermined shape that forms air passing through the cover 508 into an air curtain, such as the air curtains 110 shown in FIGS. 1 and 2.

The cover 508 of the nozzle 506 also directs the air curtain to flow in a direction in coordination with one or more passengers disposed on a group of seats below the nozzle 506. For example, the cover 508 may direct the air curtain in front of the upper body of a passenger seated below the nozzle 506 to entrain and intercept bioaerosol particles emitted from the passenger and/or bioaerosol particles from another source prior to being inhaled or respired by the passenger. In an embodiment, the nozzle 506 may direct the air curtain within a passenger breathing zone. The passenger breathing zone is relative to the location of the passenger's face. For example, the passenger breathing zone may be defined as a 12-inch sided cube of space centered on the tip of the nose of the passenger. Alternatively, the air curtain may be directed to the head of the seated passenger. In an embodiment, characteristics of the air curtain, such as the size, shape, velocity, and flow rate, are controlled to ensure utility of the air curtain and to maintain passenger comfort. For example, the velocity of the air curtain at the seated head height may not exceed 60 feet/minute on the head of the passenger.

In the illustrated embodiment, each of the outflow vents 502 is associated with a different outlet opening 505 of the PSU 514. For example, the nozzles 506 may replace individual gasper valves, such as the gasper valves shown in FIG. 6. The vent housings 504 of the outflow vents 502 may be conical or concave relative to a face panel 512 of the PSU 514 that faces the passengers, and the nozzles 506 are recessed relative to the face panel 512.

FIG. 8 is a perspective view of one of the outflow vents 502 shown in FIG. 7 according to an embodiment. The view in FIG. 8 is how the outflow vent 502 appears to a passenger in the internal cabin. The nozzle 506 is mounted to the housing 504, which may be a plate or panel of the PSU. The cover 508 of the nozzle 506 defines an elongated orifice 510 or slot that is configured to shape and discharge the air that is emitted from the nozzle 506. The elongated orifice 510 has a rectangular shape in FIG. 8, but may have other elongated shapes in other embodiments. By forming the orifice 510 to have an elongated shape, the air curtain is formed to spread widely in a width dimension while being relatively thin in a depth dimension.

FIG. 9 is an exploded view of the outflow vent 502 shown in FIG. 8. The exploded view shows the (first) outlet opening 505 of the housing 504. In the illustrated embodiment, the outlet opening 505 is circular. The cover 508 of the nozzle 506 is circular and is sized to match a diameter of the outlet opening 505. When assembled, the cover 508 may fully cover the outlet opening 505. Optionally, a gasket or other seal may be provided between the nozzle 506 and the edge of the housing 504 that defines a perimeter of the outlet opening 505 to seal the nozzle 506 to the housing 504. Sealing the nozzle 506 to the housing 504 ensures that the orifice 510 is the only air passage through the outlet opening 505. In the illustrated embodiment, the cover 508 includes an alignment feature 515 that is complementary to a respective alignment feature 516 of the housing 504 along the perimeter of the outlet opening 505. When the nozzle 506 is loaded into the outlet opening 505, the nozzle 506 is only permitted to couple to the housing 504 in an orientation in which the alignment features 515, 516 align and/or engage one another. The alignment features 515, 516 ensure that the nozzle 506 has only one or two permissible orientations relative to the housing 504 when mounted to the housing 504, which ensures that the air curtain has a desired orientation relative to the seats.

In an embodiment, the outlet opening 505 of the housing 504 is a PAO. Prior to installing the nozzle 506, another nozzle may be removed from the PAO, such as a gasper nozzle. The outflow vents 502 may be installed using existing hardware, such as the same housing 504 on a PSU previously used to mount gasper nozzles.

FIG. 10 is another perspective view of the outflow vent 502 shown in FIGS. 8 and 9, showing a backside of the outflow vent 502 that is not visible to passengers in the internal cabin. FIG. 11 is an isolated perspective view of the nozzle 506 shown in FIGS. 8 through 10. In the illustrated embodiment, the nozzle 506 includes a flue 520 that defines an enclosed passageway 522 for the air from an inlet 524 of the flue 520 to the orifice 510. The flue 520 is a duct or conduit defined by walls that extend from the cover 508. The inlet 524 receives air that is supplied by the airflow generator 106 shown in FIG. 1. In an embodiment, the inlet 524 has a greater cross-sectional area than the elongated orifice 510 which causes the air speed to increase as the air flows through the nozzle 506 due to the air being forced into a small volume. When the nozzle 506 is mounted to the housing 504, the elongated orifice 510 and the inlet 524 of the flue 520 may be disposed on different sides of the housing 504 (at the outlet opening 505). For example, the portion of the nozzle 506 that defines the orifice 510 may be disposed below the housing 504 (on the passenger side of the housing 504) and the inlet 524 is disposed above the housing 504 (within the interior of the PSU).

In an embodiment, the nozzle 506 includes at least one deflectable latch 526. The latch 526 is configured to catch on an interior surface 528 of the housing 504 proximate to the outlet opening 505. For example, the latch 526 may deflect radially inward towards a center of the nozzle 506 (e.g., towards the orifice 510) as the nozzle 506 is being loaded into the outlet opening 505 of the housing 504. As soon as a catch tab 530 of the latch 526 passes beyond the outlet opening 505, the latch 526 resiliently moves radially outward until the catch tab 530 overlaps and backs up the interior surface 528. The catch tab 530 mechanically abuts against the interior surface 528 to secure the nozzle 506 to the housing 504, without falling out of the outlet opening 505. As such, the nozzle 506 can be mounted to the housing 504 without removing or otherwise interfering with the housing 504 of the PSU, ceiling, or the like.

Figure 12:
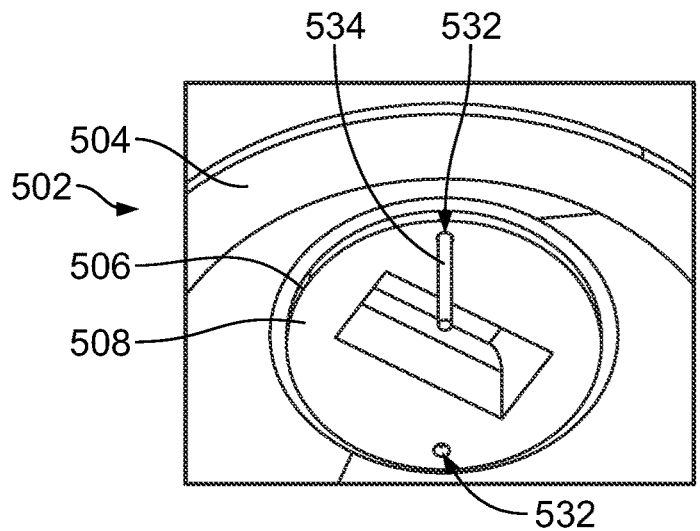
FIG. 12 is a perspective view of a portion of the outflow vent shown in FIGS. 8 through 11 during a nozzle removal operation according to an embodiment.
Figure 13:
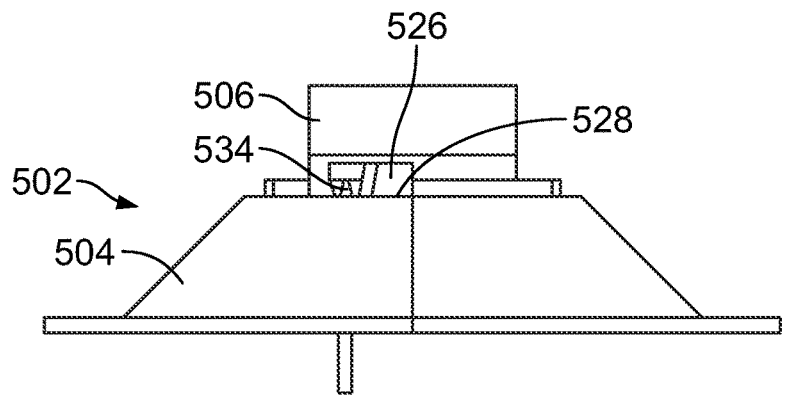
FIG. 13 is a side view of the outflow vent during the nozzle removal operation shown in FIG. 12.
Figure 14:
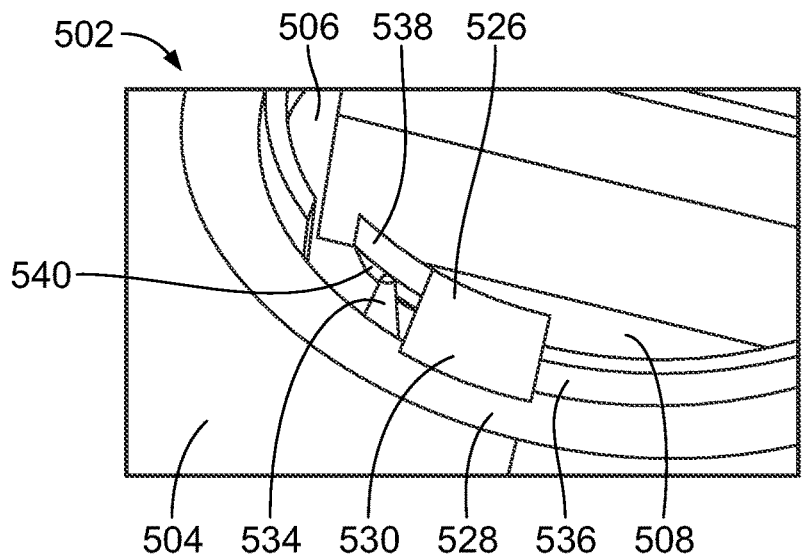
FIG. 14 is a close-up perspective view of the outflow vent during the nozzle removal operation shown in FIGS. 12 and 13.

FIG. 12 is a perspective view of a portion of the outflow vent 502 shown in FIGS. 8 through 11 during a nozzle removal operation according to an embodiment. FIG. 13 is a side view of the outflow vent 502 during the nozzle removal operation shown in FIG. 12. FIG. 14 is a close-up perspective view of the outflow vent 502 during the nozzle removal operation shown in FIGS. 12 and 13. In the illustrated embodiment, the nozzle 506 can be disconnected and extracted from the housing 504 without removing or otherwise interfering with the housing 504. For example, the cover 508 of the nozzle 506 defines at least one access opening 532 through the cover 508. Each access opening 532 aligns with a corresponding deflectable latch 526. In the illustrated embodiment, the nozzle 506 has two deflectable latches 526 and two access openings 532. Each access opening 532 is sized to permit a poking instrument 534 therethrough to engage and release the corresponding deflectable latch 526 from the interior surface 528 of the housing 504. The poking instrument 534 is disposed within one of the access openings 532 in FIGS. 12 through 14.

Referring specifically to FIG. 14, the deflectable latch 526 may have a flexible arm 536 that is fixed to the nozzle 506 at only one end of the arm 536 to enable the flexible arm 536 to deflect and pivot radially towards the center of the nozzle 506. The deflectable latch 526 may include the catch tab 530 and an actuator tab 538 mounted to the flexible arm 536 and moveable with the arm 536 relative to the cover 508. The actuator tab 538 may include an angled contact surface 540 configured to be pressed by the poking instrument 534 to cause the flexible arm 536 to pivot and move the catch tab 530 radially inward to release the catch tab 530 from the interior surface 528 of the housing 504. For example, the angled contact surface 540 may redirect the vertically upward force exerted by the poking instrument 534 to lateral and/or radial movement of the flexible arm 536 and the catch tab 530. Once the catch tab 530 is released, the nozzle 506 can be pulled downward and extracted out of the outlet opening 505 of the housing 504.

Figure 15:
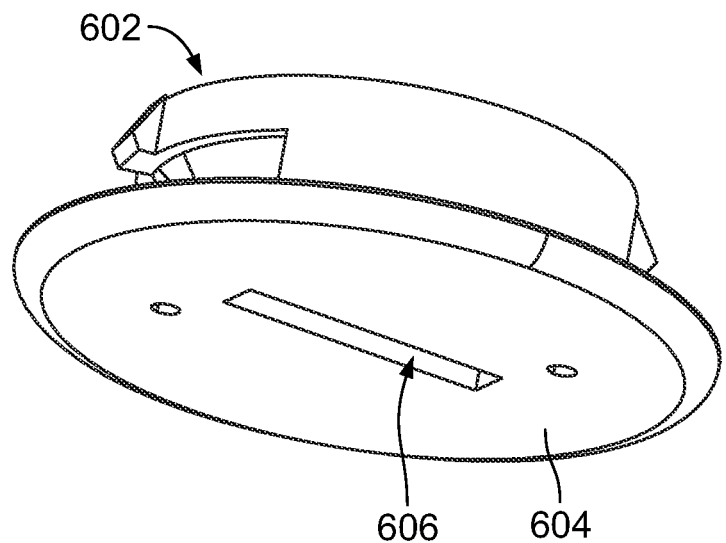
FIG. 15 is a lower perspective view of a nozzle of an outflow vent of the air curtain system according to an embodiment.
Figure 16:
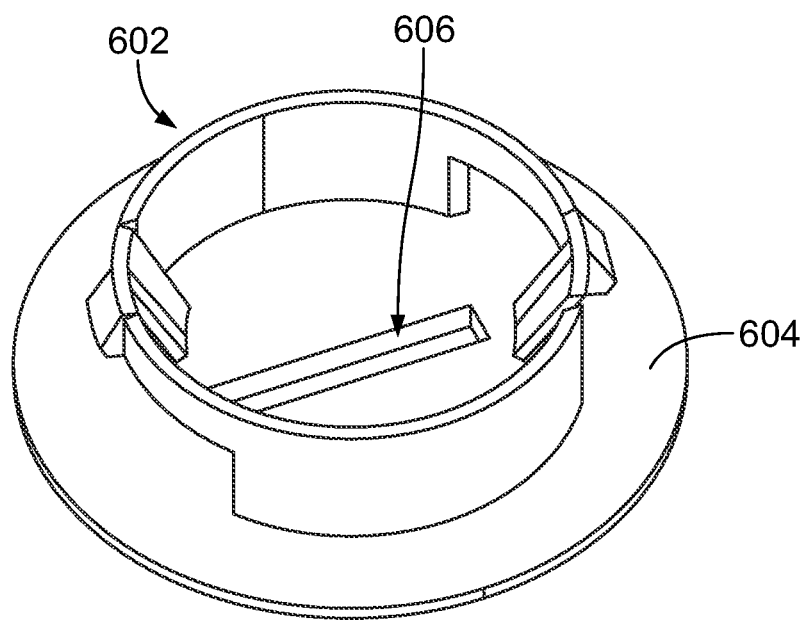
FIG. 16 is an upper perspective view of the nozzle shown in FIG. 15.

FIG. 15 is a lower perspective view of a nozzle 602 of an outflow vent of the air curtain system according to an embodiment. FIG. 16 is an upper perspective view of the nozzle 602 shown in FIG. 15. The nozzle 602 is another example of a nozzle that can be coupled within an outlet opening, such as a PAO of a PSU, to provide an air curtain. For example, the nozzle 602 is an alternative version of the nozzle 506 shown in FIGS. 8 through 14. The nozzle 602 is similar to the nozzle 506 except that the nozzle 602 does not include the flue 520 shown and described with reference to FIGS. 10 and 11. The nozzle 602 has a cover 604 that defines an elongated orifice 606. The cover 604 may be generally thin and planar. The elongated orifice 606 may have a relatively shallow depth, defined along the thickness of the cover 604. The elongated shape of the orifice 606 forms the air curtain. The cover 604 may seal to the housing to ensure that all airflow through the outlet opening is emitted through the elongated orifice. Other portions of the nozzle 602 may be the same or similar to the nozzle 506.

Figure 17:
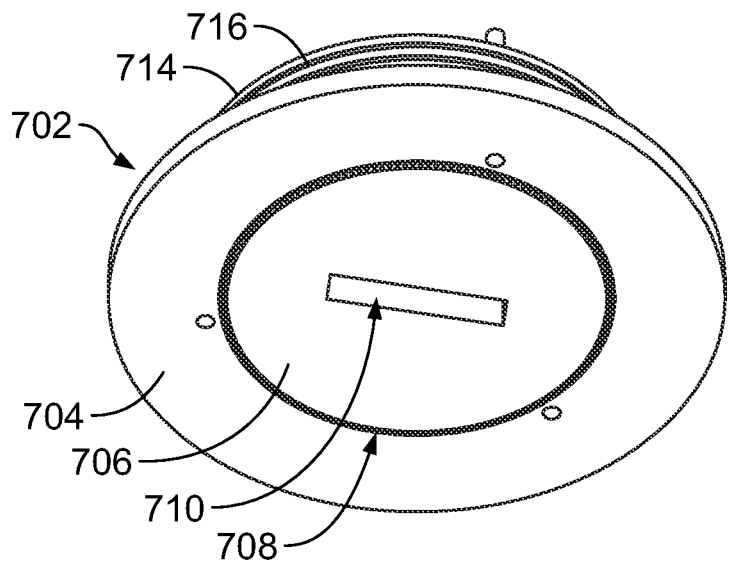
FIG. 17 is a lower perspective view of a nozzle of an outflow vent of the air curtain system according to another embodiment.
Figure 18:
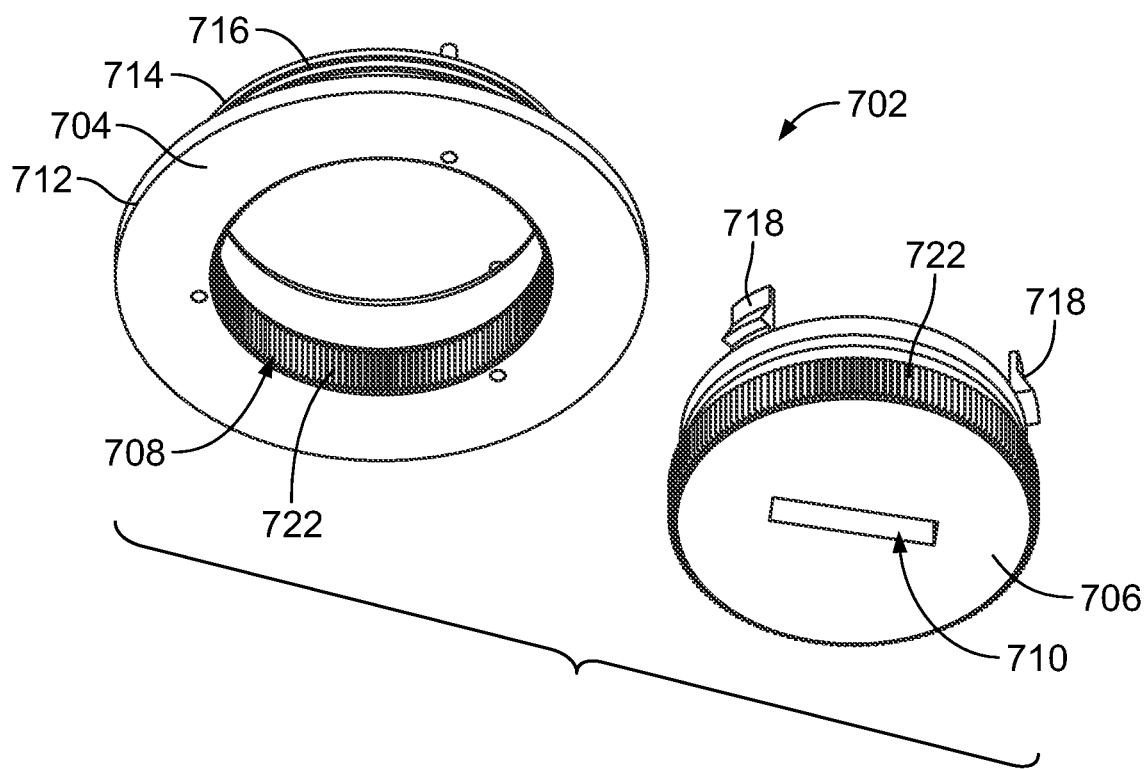
FIG. 18 is an exploded view of the nozzle shown in FIG. 17.

FIG. 17 is a lower perspective view of a nozzle 702 of an outflow vent of the air curtain system according to another embodiment. FIG. 18 is an exploded view of the nozzle 702 shown in FIG. 17. FIG. 19 is an upper perspective view of the nozzle 702 shown in FIGS. 17 and 18. The nozzle 702 is another example of a nozzle that can be coupled within an outlet opening, such as a PAO of a PSU, to provide an air curtain. For example, the nozzle 702 is an alternative version of the nozzle 506 shown in FIGS. 8 through 14 and the nozzle 602 shown in FIGS. 15 and 16. The nozzle 702 is an assembly that includes an outer ring 704 and a cover 706. The outer ring 704 couples to the housing within the outlet opening (e.g., the outlet opening 505 of the housing 504 shown in FIGS. 8 through 14). The cover 706 couples to the outer ring 704 within a center opening 708 defined by the outer ring 704. The outer ring 704 is disposed between the housing and the cover 706. In the illustrated embodiment, the cover 706 may not directly physically contact the housing, but rather is indirectly coupled to the housing via the outer ring 704. The cover 706 defines an elongated orifice 710 forms the air curtain.

The outer ring 704 may have a flange 712 and a trunk 714 extending from the flange 712. The center opening 708 extends through both the flange 712 and the trunk 714. The trunk 714 may have threads 716 for threadably coupling to the housing within the outlet opening. The thread pattern and diameter may match conventional thread patterns used by existing nozzles, such as gasper nozzles. Alternatively, the outer ring 704 may couple to the housing via discrete fasteners or latches. The cover 706 may have at least one deflectable latch 718 configured to catch on an interior surface 720 of the outer ring 704 proximate to the center opening 708 of the outer ring 704 to secure the cover 706 to the outer ring 704. Two latches 718 are included in the illustrated embodiment. The cover 706 can be coupled to the outer ring 704, either before or after coupling the outer ring 704 to the housing, by loading the cover 706 upward through the center opening 708 with the latch-end first. The latches 718 deflect radially inward towards a center of the cover 706 as the latches 718 move along the interior of the flange 712 and trunk 714. Once the latches 718 pass the interior surface 720 of the outer ring 704, which may be a ridge along the trunk 714, the latches 718 resiliently move radially outward and physically engage the interior surface 720 to secure the cover 706 to the outer ring 704. Optionally, the perimeter of the center opening 708 and the perimeter of the cover 706 may both be lined with teeth 722 that allows for selecting and retaining a selected orientation of the cover 706 relative to the outer ring 704.

As shown in FIG. 17, when fully assembled, the face of the cover 706 may be flush with the face of the outer ring 704. The cover 706 can be disconnected from the outer ring 704 by removing the entire nozzle 702 from the housing and then squeezing the latches 718 together to release the latches 718 from the interior surface 720.

FIGS. 20 through 27 show variations of the at least one orifice defined in the cover of the nozzle of one outflow vent of the air curtain system according to different embodiments. Each of the variations described with reference to FIGS. 20 through 27 could be used instead of the rectangular elongated orifices 510, 606, 710 previously described. For example, the nozzle 506, the nozzle 602, and the nozzle 702 could define one of the predetermined shapes described in FIGS. 20 through 27.

FIG. 20 is a plan view of a cover 802 of a nozzle according to an embodiment. The plan view shows how the cover 802 appears to a passenger beneath the outflow vent. FIG. 21 is a cross-sectional view of the cover 802 taken along line A-A in FIG. 20. The cover 802 includes an elongated orifice 804. The line A-A is parallel to an elongation axis of the orifice 804 and bisects the orifice 804. The orifice 804 is narrower along a center region 806 of the elongated orifice 804 than along two end regions 808 of the elongated orifice that border the center region 806. The shape of the orifice 804 may force more air out along the end regions 808 than the center region 806. Furthermore, the orifice 804 flares outward as shown in FIG. 21, which enables the airflow to spread beyond the width of the orifice 804 upon exiting through the cover 802.

Figure 22:
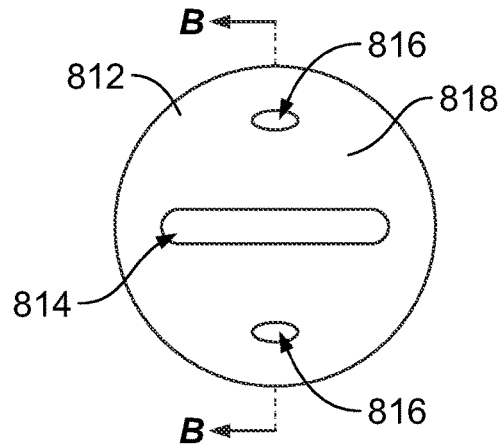
FIG. 22 is a plan view of a cover of a nozzle according to an embodiment.
Figure 23:
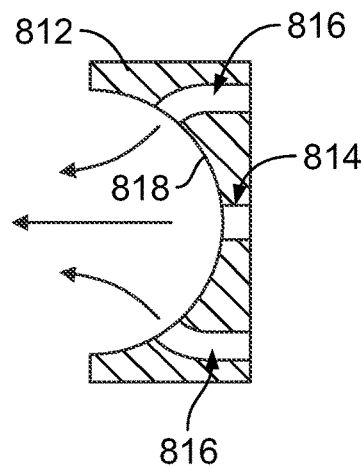
FIG. 23 is a cross-sectional view of the cover taken along line B-B in FIG. 22.

FIG. 22 is a plan view of a cover 812 of a nozzle according to an embodiment. The plan view shows how the cover 812 appears to a passenger beneath the outflow vent. FIG. 23 is a cross-sectional view of the cover 812 taken along line B-B in FIG. 22. The cover 812 includes an elongated orifice 814. The line B-B bisects the orifice 814 and is oriented perpendicular to an elongation axis of the orifice 814. The elongated orifice 814 has an elliptical, oval, or rounded rectangular shape. In the illustrated embodiment, the at least one orifice also includes at least two side ports 816 on opposite sides of the elongated orifice 814. The side ports 816 are oriented to direct air towards air that is emitted from the elongated orifice 814 to restrict spread of the air curtain along a thickness dimension. For example, as shown in FIG. 23, the front 818 (or bottom) of the cover 812 is concave such that the side ports 816 extend farther forward than the orifice 814. A majority of the air may flow through the orifice 814, but the air from the side ports 816 is used to further shape the air curtain to provide a flat, thin curtain of air, limiting the spread of the air in the depth dimension of the air curtain.

Figure 24:
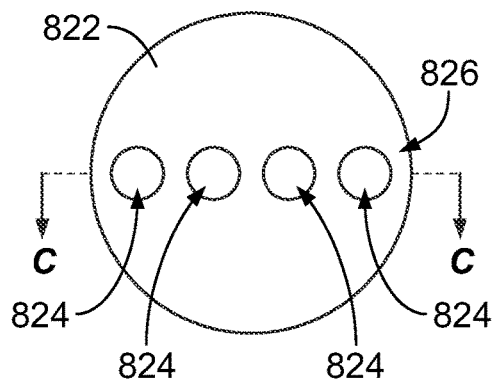
FIG. 24 is a plan view of a cover of a nozzle according to an embodiment.
Figure 25:
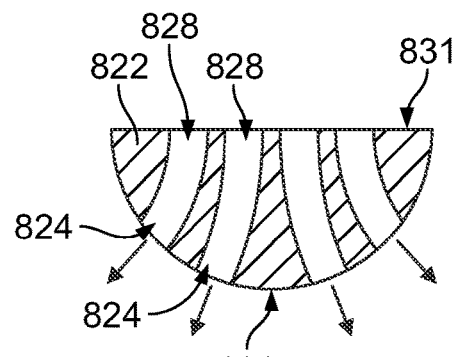
FIG. 25 is a cross-sectional view of the cover taken along line C-C in FIG. 24.

FIG. 24 is a plan view of a cover 822 of a nozzle according to an embodiment. The plan view shows how the cover 822 appears to a passenger beneath the outflow vent. FIG. 25 is a cross-sectional view of the cover 822 taken along line C-C in FIG. 24. In the illustrated embodiment, the predetermined shape of the at least one orifice of the cover 822 includes multiple orifices 824 arranged in a row 826. The line C-C is coaxial with the row 826. Each of the orifices 824 is fluidly connected to a different corresponding channel 828 that extends through the cover 822. As shown in FIG. 25, the cover 822 is thicker than other embodiments, and has a convex front 830. The channels 828 extend through the cover 822 without intersecting. The channels 828 flare apart from one another such that the orifices 824 are farther apart from one another than the channels 828 closer to a rear 831 (or inner end) of the cover 822. The channels 828 flare outward along the row 826 to provide a wide air curtain without increasing the thickness or depth of the air curtain.

Figure 26:
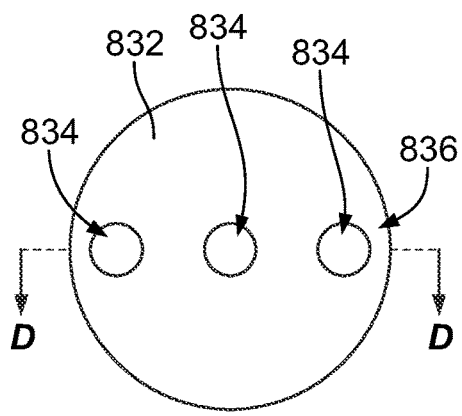
FIG. 26 is a plan view of a cover of a nozzle according to an embodiment.
Figure 27:
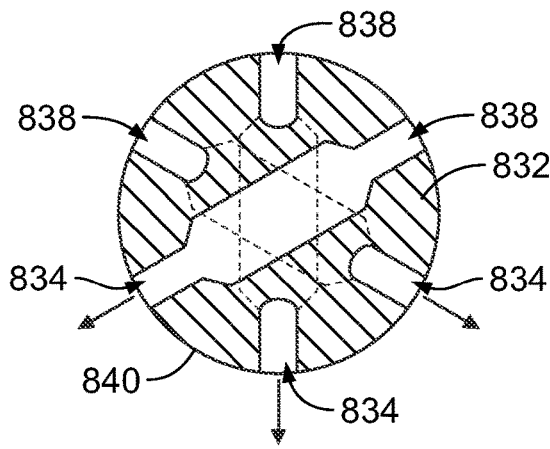
FIG. 27 is a cross-sectional view of the cover taken along line D-D in FIG. 26.

FIG. 26 is a plan view of a cover 832 of a nozzle according to an embodiment. The plan view shows how the cover 832 appears to a passenger beneath the outflow vent. FIG. 27 is a cross-sectional view of the cover 832 taken along line D-D in FIG. 26. In the illustrated embodiment, the predetermined shape of the at least one orifice of the cover 832 includes multiple orifices 834 arranged in a row 836. The line D-D is coaxial with the row 836. In the illustrated embodiment, each of the orifices 834 is fluidly connected to a different corresponding channel 838 through the cover 832. The cover 832 is thicker than some other embodiments, and has a convex front 840. Unlike the embodiment shown in FIGS. 24 and 25, the channels 838 extend across one another within an interior of the cover 832. Optionally, the channels 838 are not fluidly connected to each other. For example, the channels 838 may flatten out and/or may be jogged to bypass each other. The channels 838 may be relatively linear. The channels 838 have different orientations to provide a designated airflow spread that provides a wide air curtain without increasing the thickness or depth of the air curtain.

Figure 28:
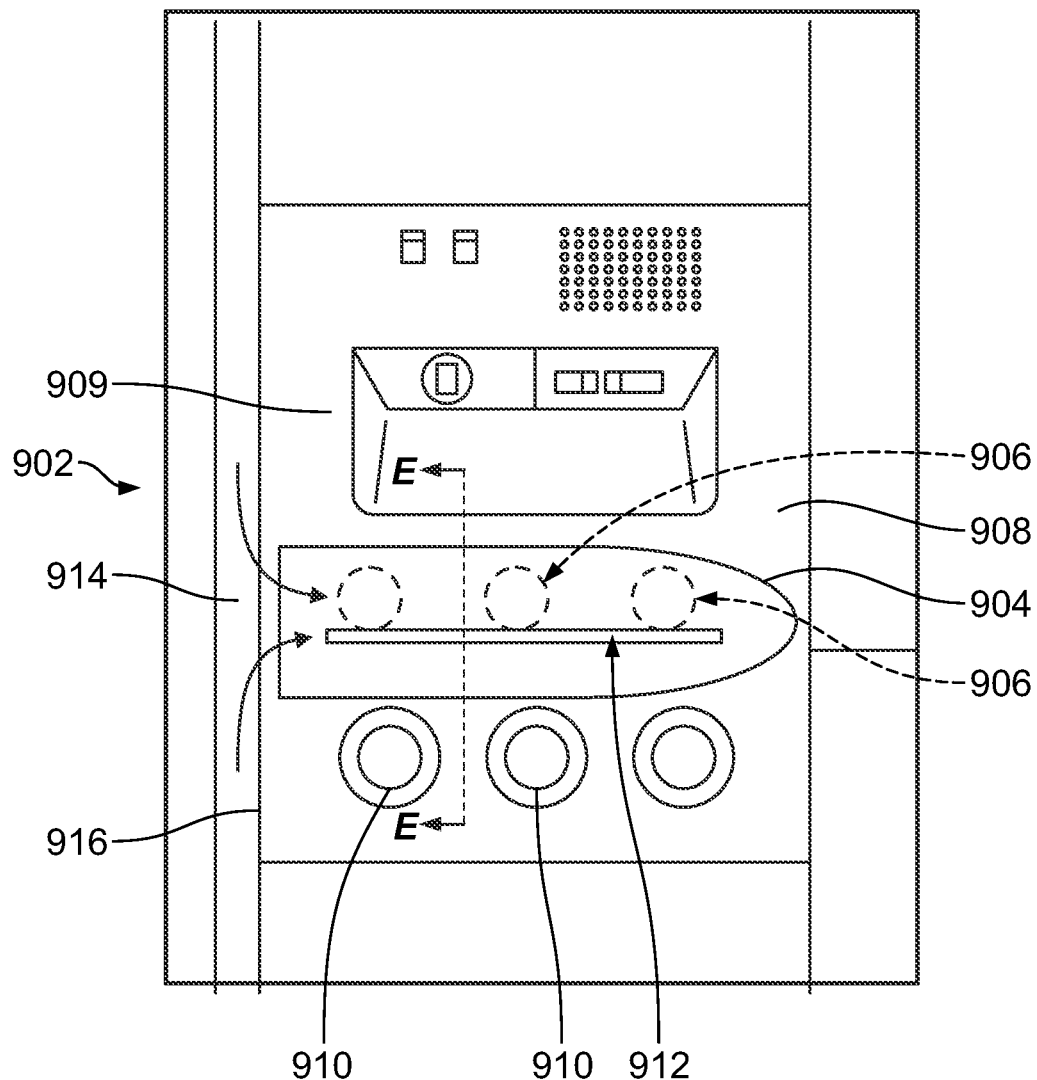
FIG. 28 is a plan view of an outflow vent of the air curtain system according to another embodiment.

FIG. 28 is a plan view of an outflow vent 902 of the air curtain system according to another embodiment. In the illustrated embodiment, the outflow vent 902 includes a cap 904 that is not disposed within a single vent outlet opening 906. Rather, the cap 904 extends across and covers multiple outlet openings 906 (e.g., multiple PAOs). In the illustrated embodiment, the cap 904 is mounted to a panel 908 (e.g., face panel) of a PSU 909. The PSU 909 also includes, for example, reading lights 910. The cap 904 extends across and collectively covers three outlet openings 906 of the PSU 909. The outlet openings 906 are shown in phantom because they are behind the cap 904.

In the illustrated embodiment, the cap 904 defines a single elongated slot 912. The cap 904 may aggregate the air emitted from each of the outlet openings 906 in a cavity defined between the panel 908 and the cap 904, and emit the combined air through the elongated slot 912 to provide the air curtain 110 (shown in FIG. 2). The cap 904 may be oriented relative to the seats in the internal cabin such that the elongated slot 912 is generally parallel to the row axis (e.g., row axis 407 in FIG. 6) of the row of seats below the cap 904. The elongated slot 912 forms the air into a wide curtain or wall of air that can extend in front of multiple seats in the row below to shield passengers that occupy the seats.

In an embodiment, the cap 904 may receive air from a different source in addition to, or instead of, the outlet openings 906. For example, the cap 904 may receive air from a main cabin air supply nozzle 914. The main cabin air supply nozzle 914 may direct air from the airflow generator 106 into the cabin. For example, the main cabin air supply nozzle 914 may supply more air (e.g., a greater flow rate of air) into the cabin than the outlet openings 906, even in combination. The main cabin air supply nozzle 914 may be located along an outboard side 916 of the PSU at or proximate to an outboard wall 302 (shown in FIG. 5) of the cabin. In an embodiment, the cap 904 receives only a portion of the total air emitted by the main cabin air supply nozzle 914. The main cabin air supply nozzle 914 may longitudinally extend beyond the edges of the cap 904, such that the nozzle 914 dispenses air directly into the cabin at locations in front of the cap 904 and rearward of the cap 904. The air from the main cabin air supply nozzle 914 that enters the cap 904 is combined with the air from the outlet openings 906, and is emitted through the slot 912. Combining the air from the outlet openings 906 with air from the nozzle 914 can increase the flow rate and amount of air flowing through the slot 912, which can enable the air curtain to entrap and entrain more bioaerosols in the air than an air curtain with a reduced amount and/or rate of airflow. In an alternative embodiment, the cap 904 may only receive air from the main cabin air supply nozzle 914, instead of receiving air from both the nozzle 914 and the outlet openings 906. For example, the cap 904 may be spaced apart from the outlet openings 906 such that the cap 904 does not cover the openings 906.

In one or more embodiments, the cap 904 is retrofittable to be added onto an existing panel within the internal cabin of a vehicle. For example, the cap 904 may be designed to secure onto the panel 908 of the PSU 909 that is present within an aircraft passenger cabin, without making design changes to the PSU 909 and/or disassembling the PSU 909. The cap 904 may mount to the panel 908 via one or more of hook and/or latch features, adhesives, fasteners (e.g., clamps, screws, bolts, etc.), or the like. In an alternative embodiment, the air curtain system 100 may be integrated into an overhead panel of an internal cabin of a vehicle, such as the panel 908 of the PSU 909. For example, the PSU 909 may be redesigned to include one or more elongated slots, similar to the slot 912 through the cap 904. The one or more elongated slots through the panel 908 optionally may replace the multiple discrete outlet openings 906 of the PSU 909, or may be included in addition to the outlet openings 906. For example, the panel 908 may define the one or more elongated slots at a location that is spaced apart in front of the outlet openings 906. The passengers can manipulate gasper nozzles in the outlet openings 906 to provide personalized air flow for comfort, and the panel 908 may provide the air curtain 110 (shown in FIG. 2) at a location in front of the upper body of the passenger, or the entire body of the passenger. The air curtain may be provided in front of the passengers to avoid discomfort caused by the air curtain consistently impinging on the passengers during a trip.

Figure 29:
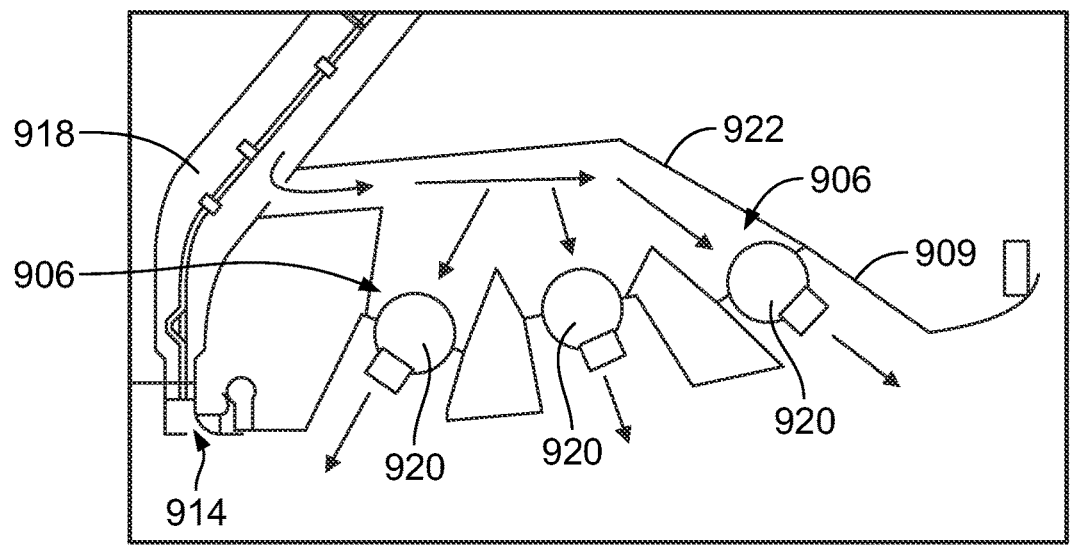
FIG. 29 is a cross-sectional view of the PSU and an air supply conduit of the vehicle without the outflow vent according to an embodiment.

FIG. 29 is a cross-sectional view of the PSU 909 and an air supply conduit 918 of the vehicle without the outflow vent 902 according to an embodiment. For example, FIG. 29 may show the PSU 909 prior to retrofitting with the cap 904 shown in FIG. 28 to define the outflow vent 902. The PSU 909 includes three gasper nozzles 920 coupled within the three corresponding outlet openings 906. A portion of the air from the supply conduit 918 is directed into a PSU plenum 922, where the air is distributed among the outlet openings 906 and the gasper nozzles 920. The remainder of the air from the supply conduit 918 is emitted from the main cabin air supply nozzle 914 into the cabin.

Figure 30:
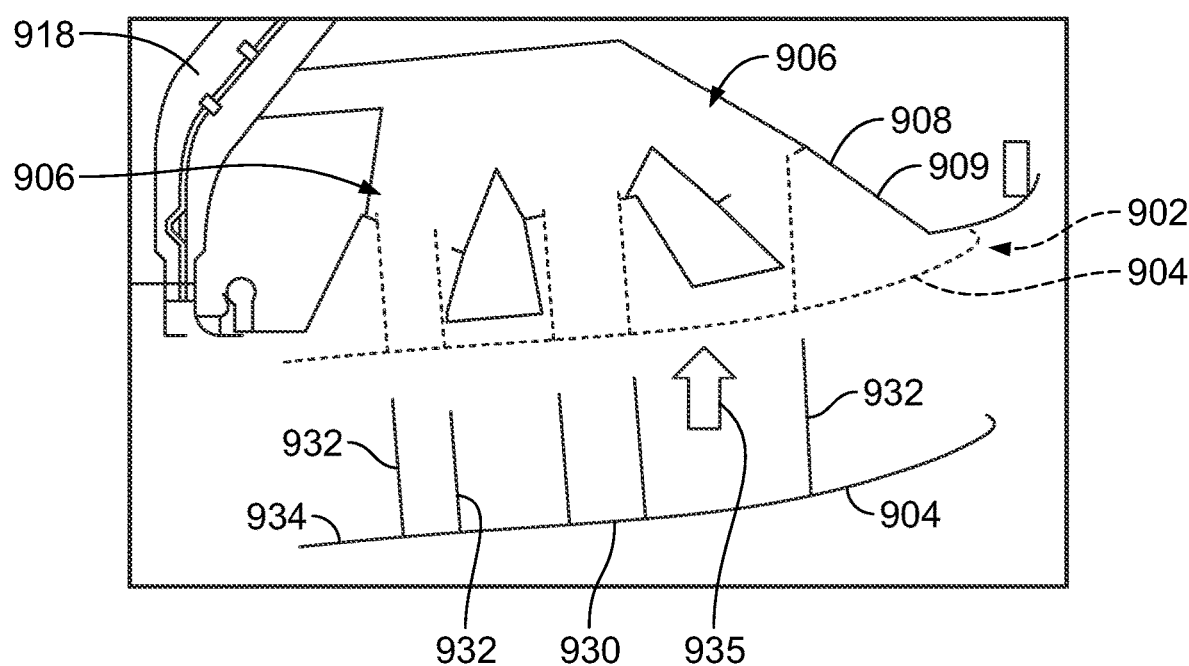
FIG. 30 is a cross-sectional view of the PSU and the air supply conduit of the vehicle showing an installation of the outflow vent according to an embodiment.

FIG. 30 is a cross-sectional view of the PSU 909 and the air supply conduit 918 of the vehicle showing an installation of the outflow vent 902 according to an embodiment. First, the gasper nozzles 920 (shown in FIG. 29) are removed from the outlet openings 906 (e.g., PAOs). Then, the cap 904 is mounted to the housing or structure 911 of the PSU 909. The cap 904 includes a base wall 930 and members 932 that extend from an interior surface 934 of the base wall 930. The cap 904 is loaded in an upward direction 935 towards the PSU 909, and the members 932 are received within the outlet openings 906. One or more of the members 932 may engage one or more surfaces of the vent housings that define outlet openings 906 for aligning and/or securing the cap 904 to the PSU 909, such as via an interference fit or a latch connection.

Figure 31:
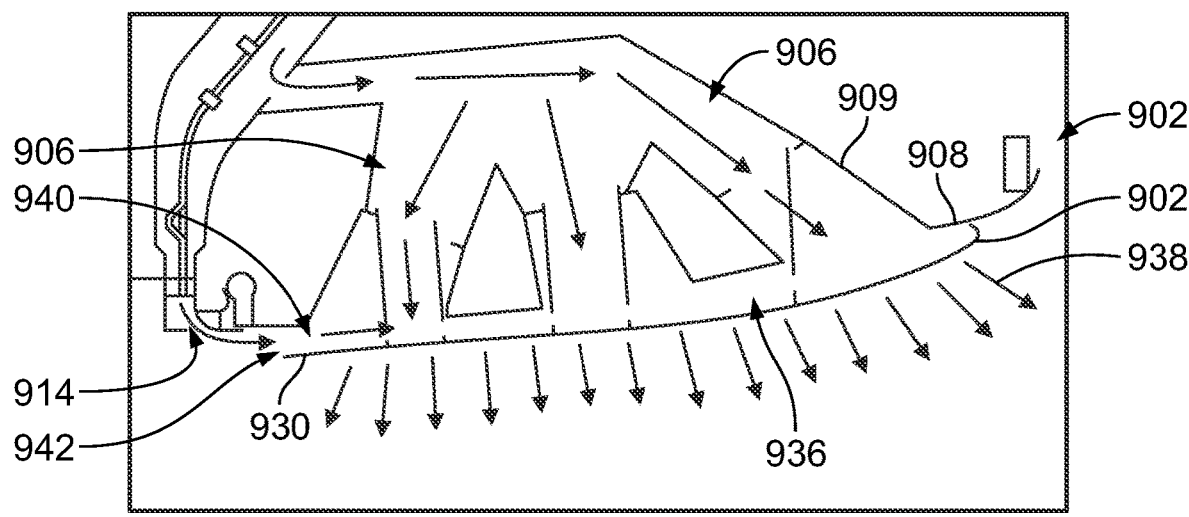
FIG. 31 is a cross-sectional view of the installed outflow vent on the PSU according to an embodiment.

FIG. 31 is a cross-sectional view of the installed outflow vent 902 on the PSU 909 according to an embodiment. When coupled to the panel 908 of the PSU 909, the base wall 930 is spaced apart from the panel 908 to define a cavity 936 between the panel 908 and the base wall 930. The air that is emitted through the outlet openings 906 is combined with air received from the main cabin air supply nozzle 914 within the cavity 936. The air from the main cabin air supply nozzle 914 is received through an inlet opening 940 at an outboard end 942 of the cap 904. Optionally, a connection element may be provided to cover and enclose the gap between the main cabin air supply nozzle 914 and the outboard end 942 of the cap 904. The connection element may direct, into the cap 904, substantially all of the airflow emitted along the portion of the main cabin air supply nozzle 914 that aligns with the cap 904. The combined air is emitted from the elongated slot 912 (shown in FIG. 28) to form the air curtain. The cross-section shown in FIG. 31 is approximately parallel to the slot 912 and offset from the slot 912, so the slot 912 is not visible. The arrows 938 represent the air curtain exiting the cap 904. In the illustrated embodiment, the cap 904 represents the nozzle of the outflow vent 902. In an alternative embodiment, the cap 904 can be installed with the gasper nozzles present in the outlet openings 906.

Figure 32:
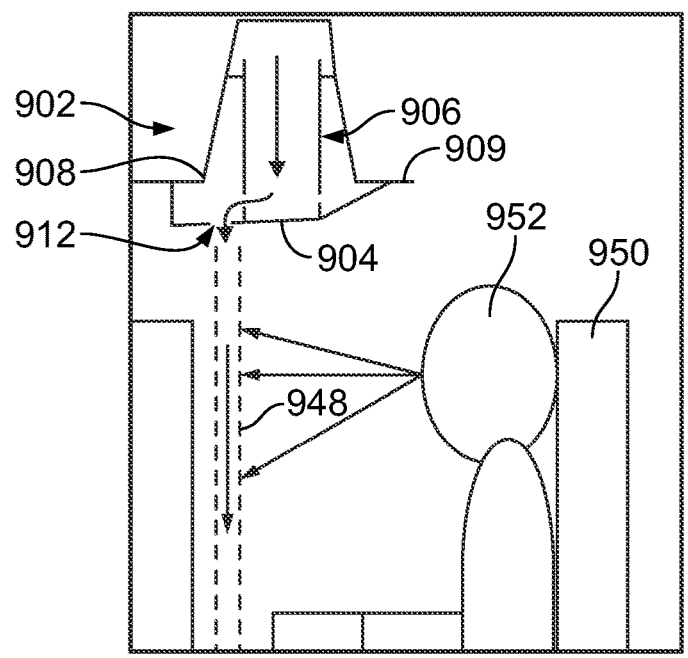
FIG. 32 is a cross-sectional view of the outflow vent taken along line E-E in FIG. 28.

FIG. 32 is a cross-sectional view of the outflow vent 902 taken along line E-E in FIG. 28. The cross-section shows a side view of the outflow vent 902. In the illustrated embodiment, the cap 904 is designed to locate the air curtain 948 in front of a passenger 952 seated in the group and/or row of seats 950 below the PSU 909. For example, the elongated slot 912 may be offset from the outlet openings 906 to bring the air curtain 948 forward of the outlet openings 906 to ensure that the air curtain 948 is in front of the passenger 952. The elongated slot 912 is located in front of the outlet openings 906 relative to a direction that the seats 950 face (e.g., relative to the orientation of the vehicle). As a result, even if the passenger 952 leans forward, the air curtain 948 remains in front of an upper body of the passenger 952 which avoids passenger discomfort attributable to sustained air flow on one area of the body. The air curtain 948 is able to capture and divert bioaerosols emitted by the passenger 952 downward, as indicated by the arrows in FIG. 32, and away from breathing zones. The air curtain 948 also protects the passenger 952 by diverting external bioaerosols before such external bioaerosols can enter the breathing zone of the passenger 952. The air curtain may divert the bioaerosols to contact surfaces, such as the floor, seats, return vents, and/or the like.

In an embodiment, the cap 904 can be designed to select the location and orientation of the air curtain 948 relative to the seats and passengers. For example, if the seat in a second vehicle is disposed farther behind the outlet opening than the distance between the seat 950 and the outlet opening 906 in the illustrated vehicle in FIG. 32, the cap can be designed and/or mounted such that the elongated slot either aligns with the outlet opening or is rearward of the outlet opening (instead of in front of the outlet opening 906 as shown in FIG. 32). The cap 904 and slot 912 may be designed such that the air curtain 948 is disposed approximately 6-18 inches, such as 12 inches, in front of the seatback of the seat 950. The air curtain 948 is vertically oriented in FIG. 32, extending straight down from the cap 904. Optionally, the cap 904 may steer the air curtain 948 along an angle forward or aft of the illustrated orientation to accommodate variations in position of the air curtain 948 to the seated passenger 952. The air curtain 948 may be steered via the use of vanes within the cap 904 and/or angling the portion of the cap 904 that defines the slot 912.

Figure 33:
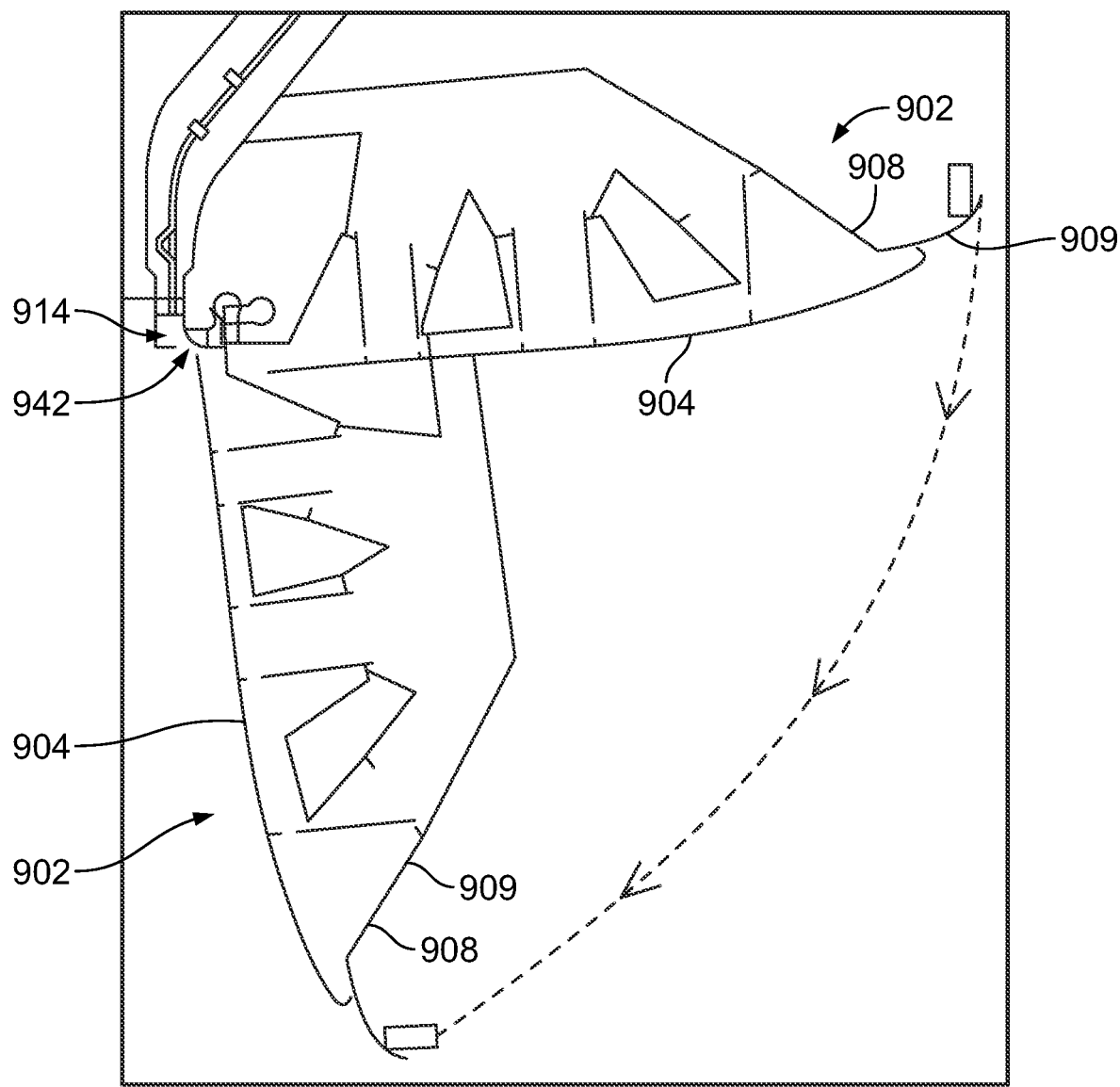
FIG. 33 is a cross-sectional view of the outflow vent on the PSU according to an embodiment.

FIG. 33 is a cross-sectional view of the outflow vent 902 on the PSU 909 according to an embodiment. The housing 911 of the PSU 909 is configured to pivot downward for maintenance purposes. In an embodiment, the cap 904 is designed to not interfere with the pivoting movement of the housing 911, such that the cap 904 can remain installed on the housing 911 even when performing maintenance on the PSU 909. For example, a gap between the outboard end 942 of the cap 904 and the main cabin air supply nozzle 914 provides sufficient clearance for the pivoting movement of the housing 911 with the cap 904 attached. Alternatively, there may be a separately removable connection element between the main cabin air supply nozzle 914 and the outboard end 942 of the cap 904, and the connection element may be removed prior to uncoupling the cap 904. The connection element may provide a wall that directs substantially all of the air emitted from the main cabin air supply nozzle 914, at the location of the connection element, into the cap 904. In another embodiment, the connection element between the cap 904 and the main cabin air supply nozzle 914 may remain intact, and only the cap 904 is removed for maintenance.

Figure 34:
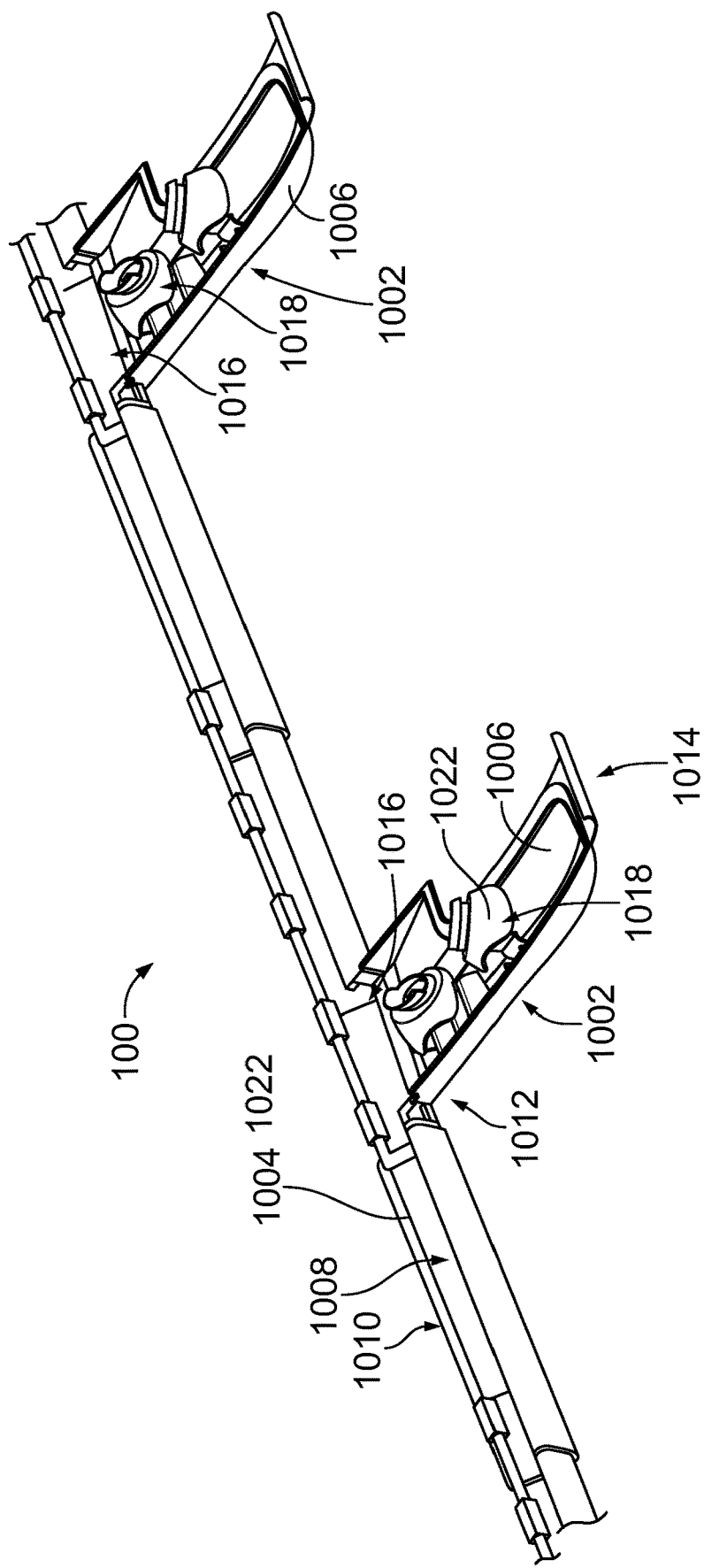
FIG. 34 is a perspective view of the air curtain system according to another embodiment.

FIG. 34 is a perspective view of the air curtain system 100 according to another embodiment. The air curtain system 100 includes one or more outflow vents 1002 coupled to a rail 1004. Two outflow vents 1002 are shown in FIG. 34. The outflow vents 1002 are coupled to the rail 1004 at different locations along the length of the rail 1004 such that the outflow vents 1002 are spaced apart from each other. The outflow vents 1002 may be copies or replicas of each another. References herein to a single outflow vent 1002 can refer to either or both of the outflow vents 1002 shown in FIG. 34. The outflow vents 1002 may be similar to the outflow vent 902 shown in FIGS. 28 and 31. For example, each outflow vent 1002 has a respective cap 1006 that releasably mounts to a panel above a row of seats. For example, the cap 1006 is retrofittable to mount onto a pre-existing panel that is not designed specifically for attachment to the cap 1006. The pre-existing panel may be a face panel of a PSU. The cap 1006 receives airflow and emits the airflow in a downward direction to form an air curtain that is associated with the row of seats below the outflow vent 1002. Optionally, the air curtain system 100 may include more than the two outflow vents 1002 shown in FIG. 34. Alternatively, the system 100 may only have one outflow vent 1002 coupled to the rail 1004.

The rail 1004 is an elongated chute, conduit, or duct that extends along a length of the internal cabin. The rail 1004 defines a channel 1008 along the length of the rail 1004. The channel 1008 receives and contains an airflow (e.g., an air stream) provided by the airflow generator 106 (shown in FIG. 1). In the illustrated embodiment, the rail 1004 is open along a top end 1010 of the rail 1004. The rail 1004 may mount to a wall, panel, or ceiling within the internal cabin at the top end 1010. When mounted, the wall, panel, or ceiling surface may enclose the top of the channel 1008 to inhibit or at least limit air from exiting the channel 1008 along the top end 1010 of the rail 1004. In at least one embodiment, the air curtain system 100 is retrofittable, and the rail 1004 may be specifically designed to align with the main cabin air supply nozzle 914 (shown in FIGS. 29 and 31). The airflow emitted from the main cabin air supply nozzle 914 may enter the channel 1008 of the rail 1004 through the open top end 1010 of the rail 1004. The airflow within the channel 1008 may flow longitudinally, and some of the airflow exits the channel 1008 at the outflow vents 1002 to be emitted as air curtains.

The cap 1006 of each outflow vent 1002 has a first end 1012 and a second end 1014 that is opposite the first end 1012. The cap 1006 is elongated from the first end 1012 to the second end 1014. The first end 1012 is coupled to the rail 1004. In an embodiment, the first end 1012 physically contacts the rail 1004 and is connected to the rail via one or more fasteners, latches, tabs, or the like. Optionally, a discrete attachment member and/or vibration absorption member may be disposed at the interface between the rail 1004 and the first end 1012 of the cap 1006. The cap 1006 has a three-dimensional shape (e.g., extends in three dimensions), and the first end 1012 of the cap 1006 defines an inlet opening 1016. The inlet opening 1016 is fluidly connected to the channel 1008 of the rail 1004. The airflow within the channel 1008 can exit the rail 1004 and enter the cap 1006 through the inlet opening 1016 when the cap 1006 is coupled to the rail 1004.

In one or more embodiments, the outflow vent 1002 also includes an attachment unit 1018 on the cap 1006. The attachment unit 1018 assists with mounting (and dismounting) the cap 1006 to the panel above the row of seats. In the illustrated embodiment, the attachment unit 1018 includes at least one frame 1022 sized, shaped, and positioned to align with an enter an outlet opening. The outlet opening may be a PAO. The frame 1022 may engage a vent housing or socket (e.g., vent housing 504 in FIG. 7) that defines the outlet opening (e.g., outlet opening 505 in FIG. 7) to ensure that the cap 1006 is properly positioned relative to the panel and the outlet opening. The frame 1022 may also secure to the vent housing via a deflectable latch or an interference fit to mount the cap 1006 to the panel. As described above with respect to FIGS. 29 and 30, gasper nozzles may need to be removed from corresponding outlet openings before the one or more frames 1022 of the attachment unit 1018 can properly enter the outlet openings and interact with the vent housings.

The air curtain system 100 shown in FIG. 34 is designed to be installed within an enclosed room or cabin, such as an internal cabin of a vehicle. When installed, the air curtain system 100 shown in FIG. 34 resembles the embodiment shown in FIG. 2. For example, the outflow vents 1002 are associated with different rows of seats. Each outflow vent 1002 forms an air curtain that is discharged in a downward direction towards the floor 122. The outflow vents 1002 are positioned and oriented relative to the rows of seats such that each air curtain is provided between two rows of seats and effectively shields the passengers occupying the seats from airborne pathogen transmission. For example, a first outflow vent 1002 may form an air curtain that is associated with a first row, and the second outflow vent 1002 may form an air curtain that is associated with a second row disposed behind the first row (relative to a front of the internal cabin and/or a front of the vehicle). The outflow vents 1002 may mount to panels of a PSU disposed above passenger seats, similar to the outflow vent 902 in FIG. 28.

Figure 35:
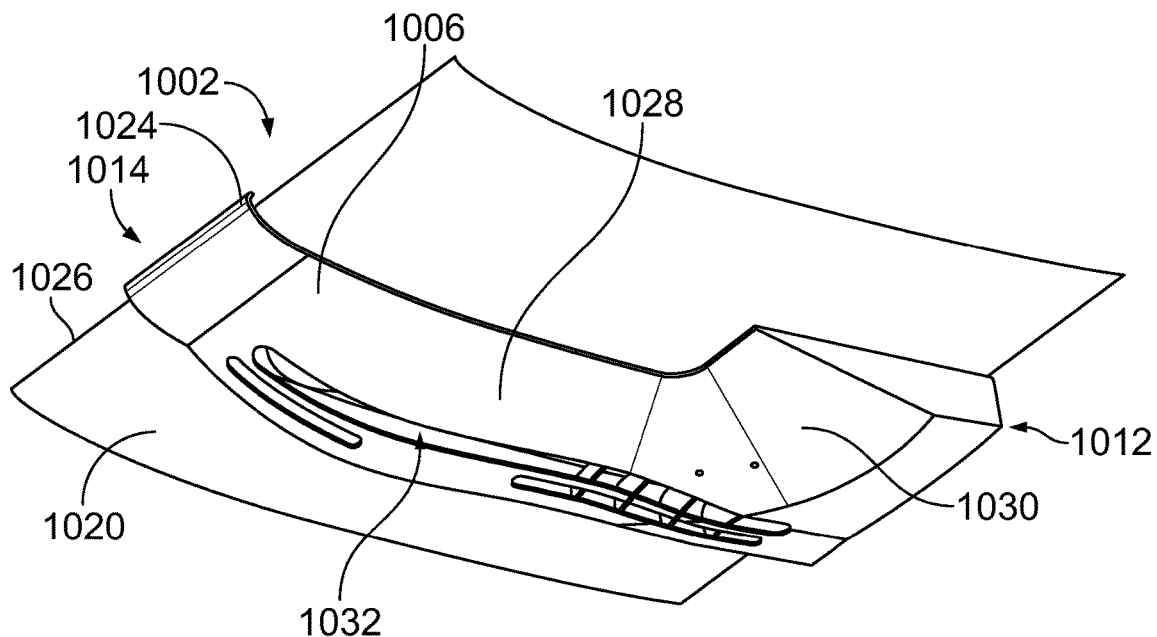
FIG. 35 is a perspective view of the outflow vent mounted to a panel according to an embodiment.

FIG. 35 is a perspective view of the outflow vent 1002 mounted to a panel 1020 according to an embodiment. The illustrated view indicates the appearance of the outflow vent 1002 to people in the internal cabin, look up at the outflow vent 1002 from a position below. The cap 1006 mounted to the panel 1020. The panel 1020 according to an embodiment is a part of a PSU, such as a face panel of the PSU. In an alternative embodiment, the panel 1020 may be a component of an overhead stowage bin assembly, a ceiling panel, or the like.

The cap 1006 may be contoured to correspond to a curvature of the panel 1020. The second end 1014 of the cap 1006 may have a hook 1024. The hook 1024 catches on an edge 1026 of the panel 1020 to assist with positioning the cap 1006 relative to the panel 1020 and mounting the cap 1006 to the panel 1020. For example, the mounting process of the cap 1006 may include coupling the first end 1012 of the cap 1006 to the rail 1004 and then pushing the second end 1014 upward. The cap 1006 may partially deform to enable the hook 1024 to pass beyond the edge 1026, at which point the cap 1006 resiliently returns and the hook 1024 catches on the edge 1026.

The cap 1006 has a base wall 1028 which extends from the first end 1012 to the second end 1014. The base wall 1028 has an exterior surface 1030 that is visible to the passengers. The base wall 1028 defines at least one slot 1032 through the thickness of the base wall 1028. The at least one slot 1032 emits the airflow from the cap 1006 to provide the air curtain. The at least one slot 1032 is sized, shaped, and positioned to form the air curtain to have a designated size, shape, location, and other properties. The other properties may include consistency or uniformity in the flow rate or amount of air within different portions of the air curtain. For example, the slots 1032 may be designed and arranged to avoid gaps or breaks in the air curtain, which could enable pathogens in the air to penetrate the air curtain.

Figure 36:
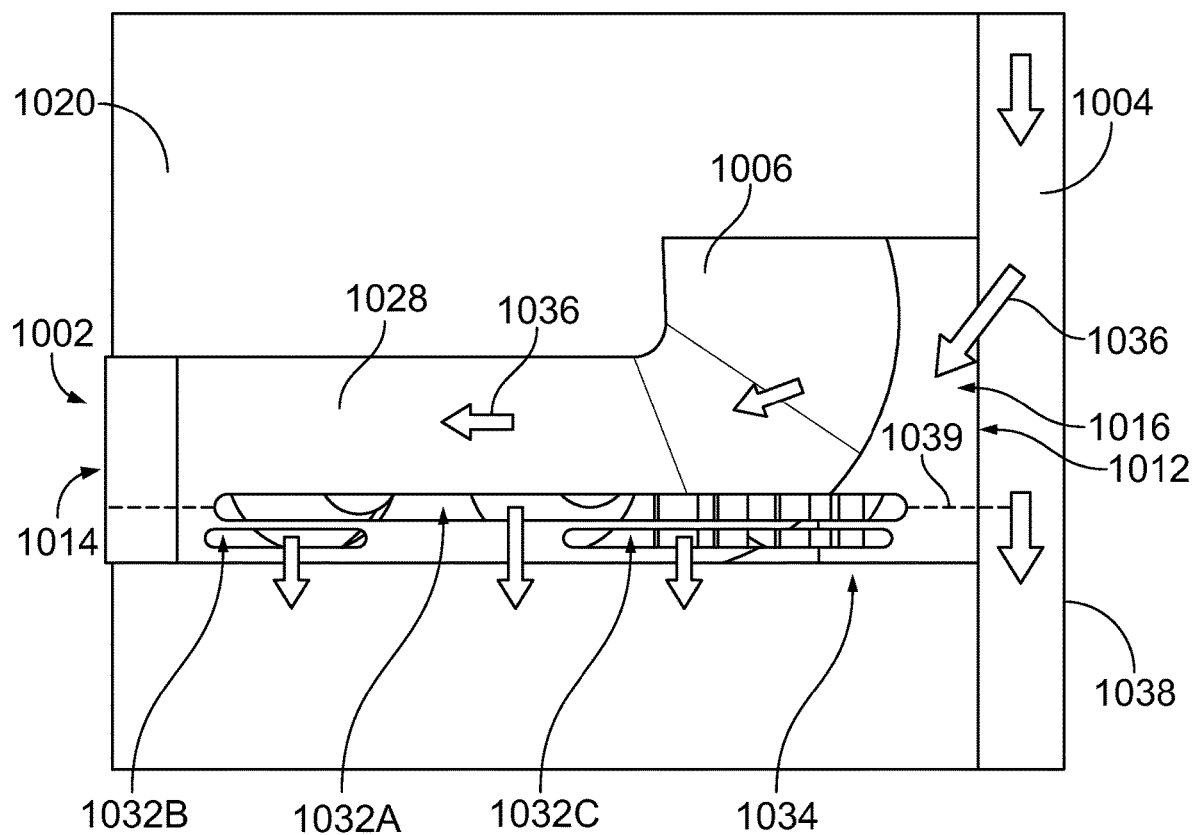
FIG. 36 is a plan view of the outflow vent mounted to the panel shown in FIG. 35.

FIG. 36 is a plan view of the outflow vent 1002 mounted to the panel 1020 shown in FIG. 35. In the illustrated embodiment, the base wall 1028 of the cap 1006 defines three slots 1032A, 1032B, 1032C. The slots 1032A-C may be parallel to each other. For example, each of the slots 1032A-C may be elongated in the same dimension as the cap 1006, which is longer along the lateral axis 132 (shown in FIG. 2) than along the other perpendicular axes 128, 130. The slots 1032A-C are grouped proximate to a front end 1034 of the cap 1006, which is the end closest to the front of the internal cabin and/or the front of the vehicle. The slots 1032A-C may be located proximate to the front end 1034 to provide the air curtain in front of the seats in the associated row below, such that the air curtain does not impinge on the bodies of the passengers seated in the row.

In the illustrated embodiment, the first slot 1032A is longer than the second and third slots 1032B, 1032C. The first slot 1032A also may be at least slightly wider than the slots 1032B, 1032C. The second slot 1032B is disposed proximate to the second end 1014 of the cap 1006. The third slot 1032C is disposed proximate to the first end 1012 of the cap 1006. The number, size, and arrangement of the slots 1032 in FIG. 36 represents a non-limiting example. Optionally, the cap 106 may define only one slot 1032, only two slots 1032, or at least four slots 1032.

FIG. 36 shows the rail 1004 adjacent the cap 1006. The airflow (indicated by the arrows 1036) is conveyed by the rail 1004 and enters the cap 1006 through the inlet opening 1016. The airflow within the cap 1006 is emitted through the slots 1032A-C defined through the base wall 1028 to form the air curtain. The slots 1032A-C may define an air curtain axis 1039, and each of the slots 1032 may be parallel to, or coaxial with, the air curtain axis 1039. The air curtain axis 1039 may be generally parallel to a row axis (e.g., row axis 407 in FIG. 6) of the row of seats.

In an embodiment, the rail 1004 is disposed at, or proximate to, an outboard wall 1038 of the internal cabin. The first end 1012 of the cap 1006 which couples to the rail 1004 is an outboard end, and the second end 1014 is an inboard end. The second end 1014 may be the portion of the outflow vent 1002 closest to an aisle of the internal cabin.

Referring now to both FIGS. 35 and 36, the cap 1006 optionally has an L-shape. The L-shape may be to ensure that a sufficient amount of air is received into the cap 1006 to provide a desired air curtain, as the inlet opening 1016 is defined by the foot of the "L". The cutout region of the "L" may be provided to reduce the footprint of the cap 1006 and provide space for other components, such as reading lights, call buttons, display devices, mounts for display devices, drop-down panels for emergency equipment, and/or the like. The cap 1006 may have a relatively slim shape to enable the retrofitted cap 1006 to essentially blend into the existing structure within the internal cabin. For example, the cap 1006 may taper towards the edges to provide a smooth transition at the interface between the cap 1006 and the panel 1020.

Figure 37:
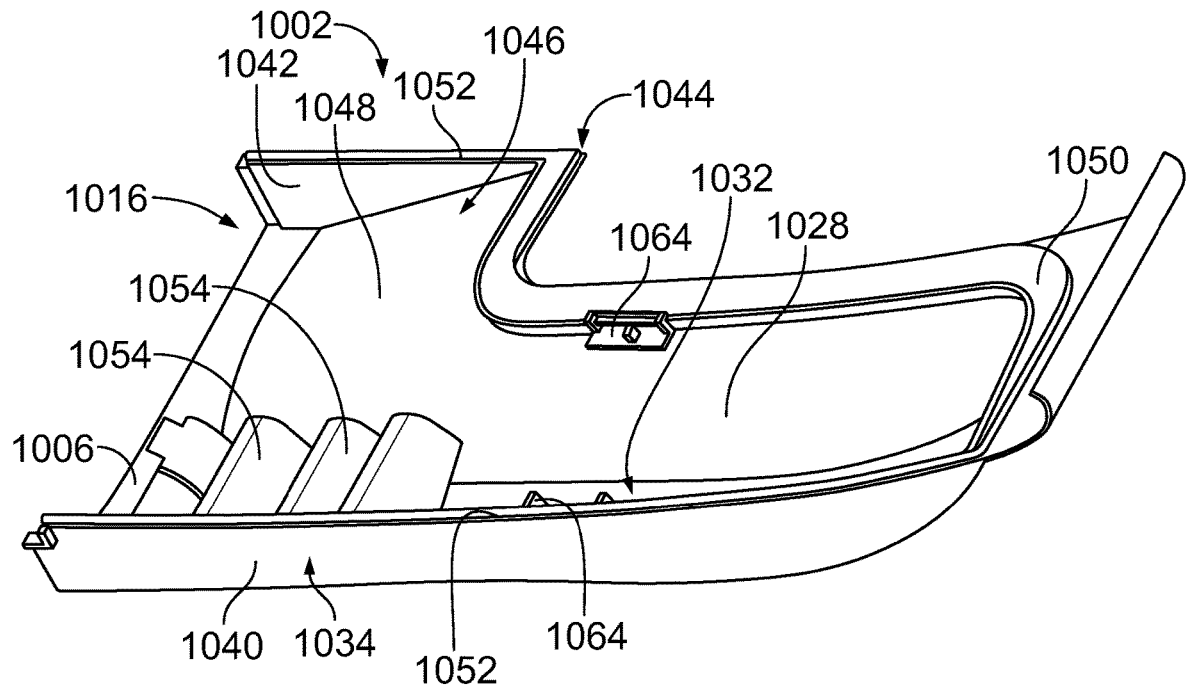
FIG. 37 is a perspective view of a cap of the outflow vent shown in FIGS. 34 through 36.

FIG. 37 is a perspective view of the cap 1006 of the outflow vent 1002 shown in FIGS. 34 through 36. The cap 1006 has a three-dimensional shape. In addition to the base wall 1028, the cap 1006 includes at least a first side wall 1040 at the front end 1034 and a second side wall 1042 at a rear end 1044 of the cap 1006. The cap 1006 defines a cavity 1046 that receives the airflow. The cavity 1046 extends between the two side walls 1040, 1042 and between the base wall 1028 and the panel 1020 (shown in FIG. 35) when mounted to the panel 1020. The airflow enters the cavity 1046 through the inlet opening 1016, and exits the cavity 1046 through the at least one slot 1032.

In the illustrated embodiment, the cap 1006 has a compressible seal 1050 along a top edge 1052 of the cap 1006. The top edge 1052 interfaces with the panel 1020 when mounted to the panel 1020. The compressible seal 1050 may be a foam material, a rubber material, or the like. When the cap 1006 is mounted to the panel 1020, the compressible seal 1050 may at least partially compress at the interface between the cap 1006 and the panel 1020 to seal the interface. For example, the compressible seal 1050 may inhibit air from exiting the cavity 1046 through a leak path at the interface.

The outflow vent 1002 may include at least one vane 1054 for altering a flow direction of the airflow that enters the cavity 1046. In the illustrated embodiment, multiple vanes 1054 are mounted to an interior surface 1048 of the cap 1006. The interior surface 1048 may be a surface of the base wall 1028, the first side wall 1040, or the second side wall 1042. The vanes 1054 are angled relative to the interior surface 1048 to direct the airflow received through the inlet opening 1016 towards the at least one slot 1032. The number, location, and angular orientations of the vanes 1054 may be selected based on designated properties of the air curtain and properties of the airflow received into the cap 1006.

Figure 38:
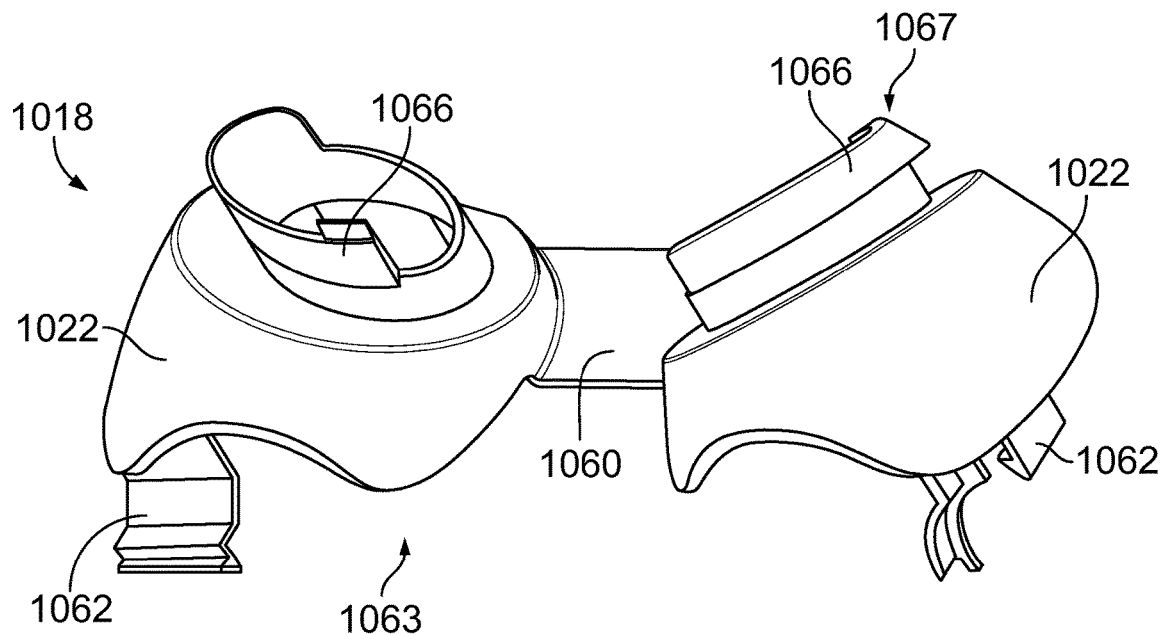
FIG. 38 is a perspective view of an attachment unit of the outflow vent according to an embodiment.

FIG. 38 is a perspective view of the attachment unit 1018 of the outflow vent 1002 according to an embodiment. The attachment unit 1018 in FIG. 38 is a discrete component from the cap 1006. The attachment unit 1018 is removably attachable to the cap 1006. For example, the attachment unit 1018 can be detached from the cap 1006 to provide more compact storage and/or shipping. Optionally, forming the attachment unit 1018 separate from the cap 1006 may enable less complex manufacturing relative to integrally forming the cap 1006 and the attachment unit 1018 as a unitary, monolithic body.

The attachment unit 1018 is configured to couple to the cap 1006 at least partially within the cavity 1046. The attachment unit 1018 includes at least one frame 1022. The attachment unit 1018 has two frames 1022 connected to each other via a tie bar 1060 in FIG. 38. Each of the frames 1022 is sized to be received in an outlet opening, such as a PAO. For example, the frames 1022 may have generally conical shapes that correspond to the shape of the outlet openings. Optionally, the frames 1022 may be generally cylindrical.

The attachment unit 1018 may have only one frame 1022 or at least three frames 1022 in other embodiments.

In the illustrated embodiment, the attachment unit 1018 includes multiple coupling latches 1062 for releasably coupling to the cap 1006. The coupling latches 1062 are disposed at a first end 1063 of the attachment unit 1018. The first end 1064 may be referred to as a proximal end because it is the end most proximate to the surface of the cap 1006. The coupling latches 1062 may be resiliently deflectable tabs. Referring back to FIG. 37, the cap 1006 may include latch features 1064 that are complementary with the coupling latches 1062 of the attachment unit 1018. The latch features 1064 may be catches or deflectable latches that interact with the coupling latches 1062 to releasably secure the attachment unit 1018 to the cap 1006.

Each frame 1022 of the attachment unit 1018 includes at least one deflectable mounting latch 1066 at or proximate to a second end 1067 of the attachment unit 1018. The second end 1067 is opposite the first end 1063, and may be referred to as a distal end because it is the end farthest from the cap 1006 when attached to the cap 1006. In the illustrated embodiment, each frame 1022 has a single mounting latch 1066 that has a curved shape and is configured to deflect radially. The mounting latches 1066 are designed to catch on edges of vent housings that define the outlet openings, which secures the cap 1006 to the panel 1020.

Figure 39:
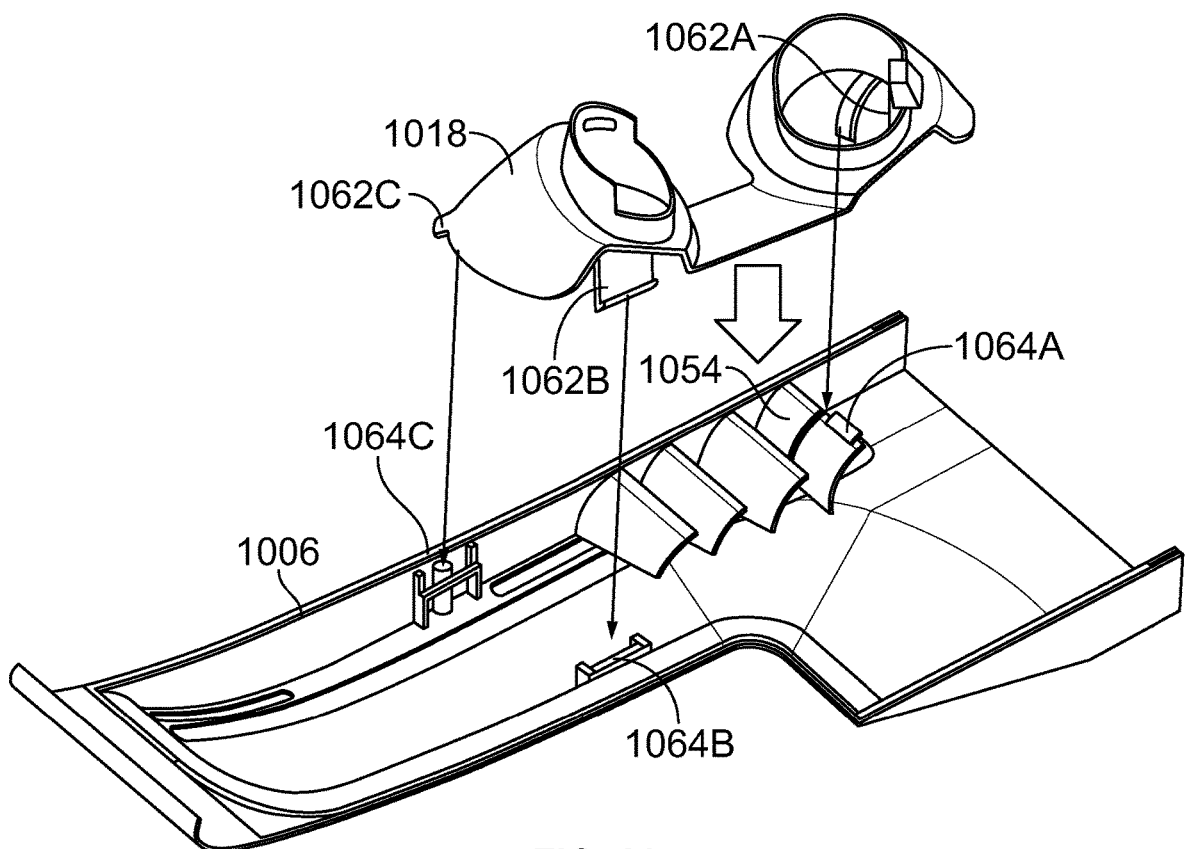
FIG. 39 is a perspective exploded view showing the attachment unit poised for coupling to the cap according to an embodiment.

FIG. 39 is a perspective exploded view showing the attachment unit 1018 poised for coupling to the cap 1006 according to an embodiment. The attachment unit 1018 optionally includes three coupling latches 1062A, 1062B, 1062C that couple to three corresponding latch features 1064A, 1064B, 1064C, respectively, of the cap 1006 to releasably secure the attachment unit 1018 to the cap 1006. A first latch feature 1064A of the cap 1006 extends from one of the vanes 1054 in the illustrated embodiment.

Figure 40:
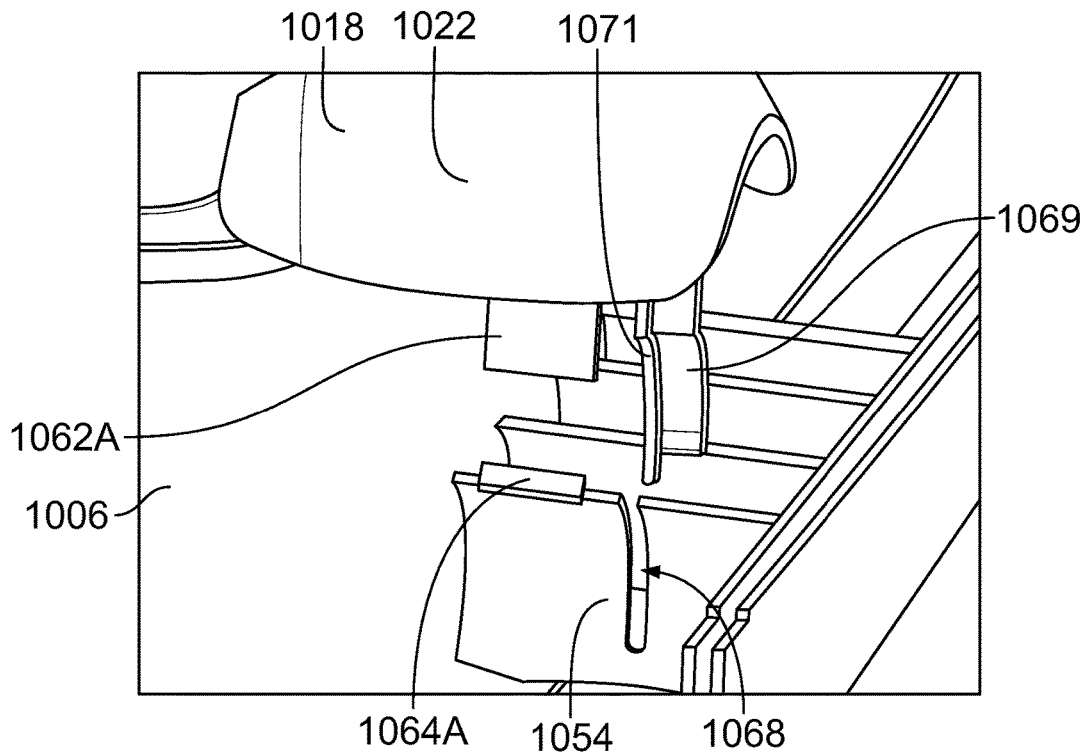
FIG. 40 is an exploded view showing a portion of the attachment unit poised for coupling to the cap.

FIG. 40 is an exploded view showing a portion of the attachment unit 1018 poised for coupling to the cap 1006. The illustrated portion depicts the first latch feature 1064A on the vane 1054 and a first coupling latch 1062A that engages the first latch feature 1064A. In an embodiment, the vane 1054 that has the first latch feature 1064A defines an alignment slot 1068. The attachment unit 1018 includes a guide pin 1069 with a flange 1071. The guide pin 1069 is proximate to the first coupling latch 1062A and extends from the frame 1022 in generally the same direction as the first coupling latch 1062A. The flange 1071 of the guide pin 1069 is received within the alignment slot 1068 of the vane 1054 as the attachment unit 1018 and the cap 1006 are moved towards each other to align the two components during the coupling operation.

Figure 41:
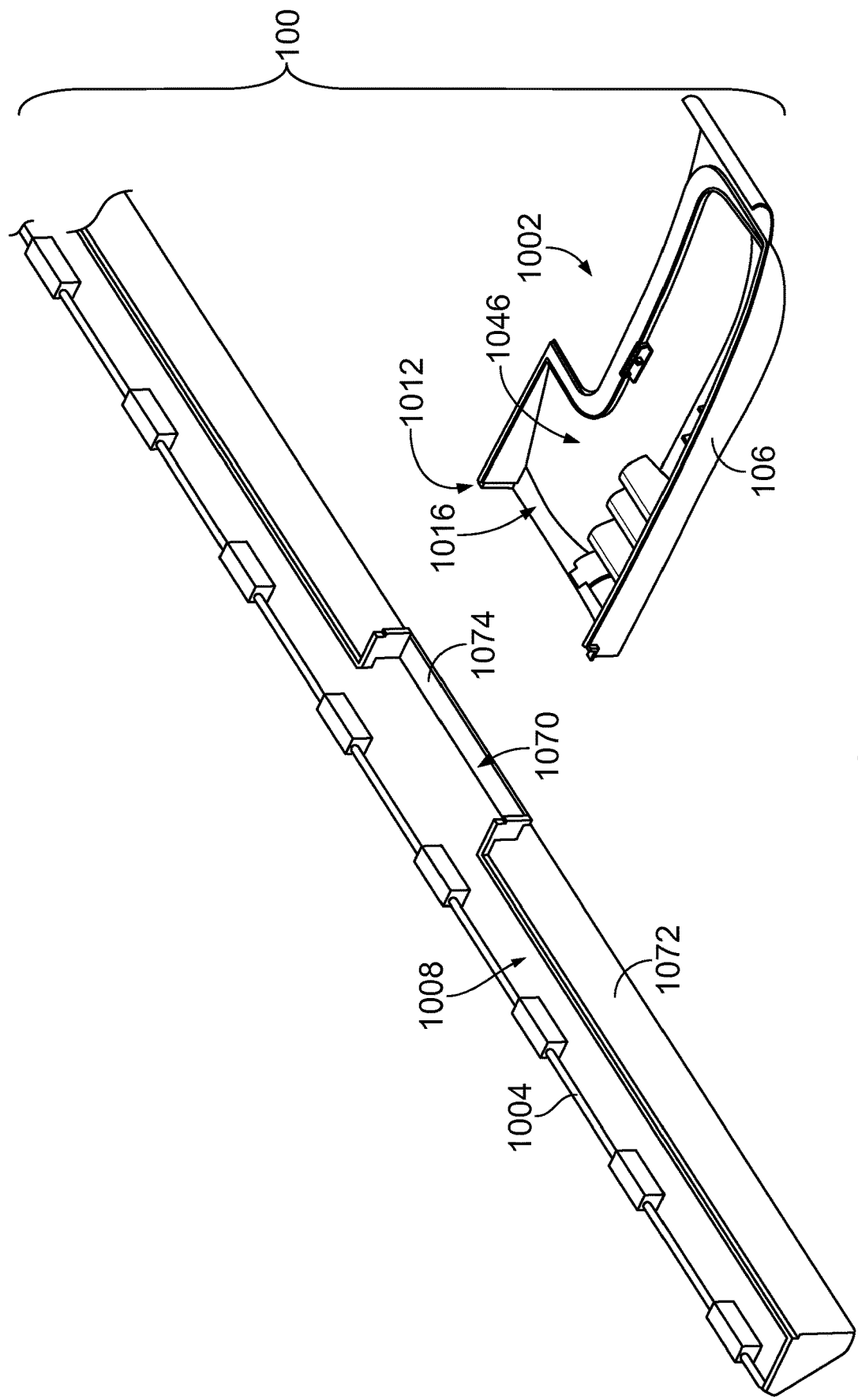
FIG. 41 is a perspective exploded view showing one cap of an outflow vent poised for coupling to a segment of the rail.

FIG. 41 is a perspective exploded view of the air curtain system 100 showing one cap 1006 of an outflow vent 1002 poised for coupling to a segment of the rail 1004. The attachment unit 1018 is not shown in FIG. 41, although the attachment unit 1018 may be attached to the cap 1006 prior to actually coupling the cap 1006 to the rail 1004. The rail 1004 may define a port 1070 along a side wall 1072 of the rail 1004. The port 1070 has a size that corresponds to the first end 1012 of the cap 1006. The rail 1004 can have multiple ports 1070 spaced apart along the length to accommodate multiple outflow vents 1002, such as shown in FIG. 34.

In an embodiment, the first end 1012 is inserted partially into the port 1070, or a flange 1074 of the port 1070 is inserted partially into the inlet opening 1016, as the cap 1006 is coupled to the rail 1004. Optionally, deflectable latches, fasteners, or adhesives may be used to secure the flange 1074 of the port 1070 to the first end 1012 of the cap 1006. When coupled, at least some of the airflow within the channel 1008 of the rail 1004 can exit the channel 1008 through the port 1070 and enter the cavity 1046 of the cap 1006 for forming the air curtain. Optionally, the rail 1004 may include air directing features, such as vanes, within the channel 1008. The air directing features redirect the airflow towards the port 1070.

Figure 42:
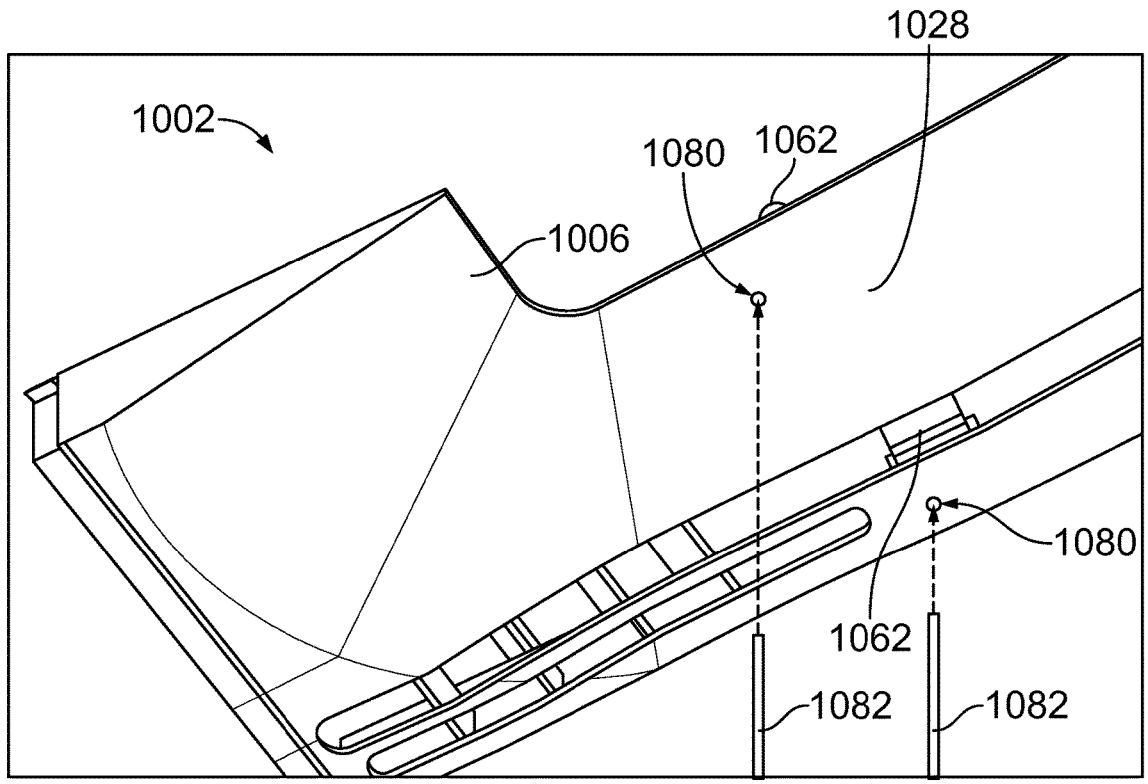
FIG. 42 is a perspective view of a portion of the outflow vent during a nozzle removal operation according to an embodiment.

FIG. 42 is a perspective view of a portion of the outflow vent 1002 during a nozzle removal operation according to an embodiment. The cap 1006 may include multiple access openings 1080 through the base wall 1028 at locations that correspond to the engaged coupling latches 1062 and latch features 1064 (shown in FIG. 39). The access openings 1080 permit insertion of a poking instrument 1082. The end of the poking instrument 1082 may force the coupling latches 1062 and/or the latch features 1064 to deflect out of contact with each other, permitting removal of the cap 1006 from the attachment unit 1018.

Figure 43:
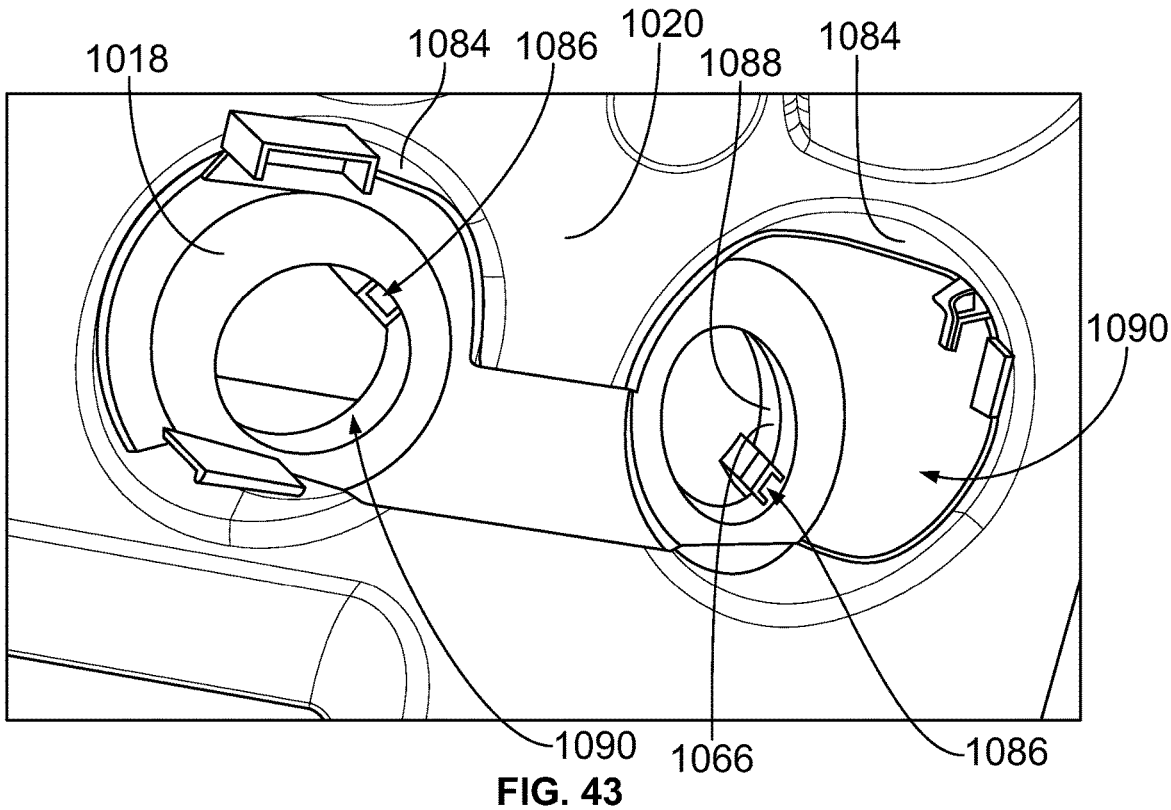
FIG. 43 is a perspective view of the attachment unit mounted to vent housings connected to the panel according to an embodiment.

FIG. 43 is a perspective view of the attachment unit 1018 mounted to vent housings 1084 (e.g., sockets) connected to the panel 1020 according to an embodiment. The mounting latches 1066 are engaged with edges (not shown) of the vent housings 1084 to secure the attachment unit 1018 to the panel 1020. In an embodiment, the attachment unit 1018 includes a release channel 1086 connected to each of the mounting latches 1066. The release channel 1086 is located along an inner surface 1088 of each mounting latch 1066. The release channel 1086 is accessible via inserting a poking instrument, such as the instrument 1082 in FIG. 42, through a central cavity 1090 of the frame 1022. When inserted into the release channel 1086, an end of the poking instrument may cause the mounting latch 1066 to deflect radially inward towards a center of the central cavity 1090, which disconnects the mounting latch 1066 from the edge of the vent housing 1084. When the mounting latch 1066 is disconnected, the attachment unit 1018 can be extracted from the vent housings 1084 and removed from the panel 1020.

Figure 44:
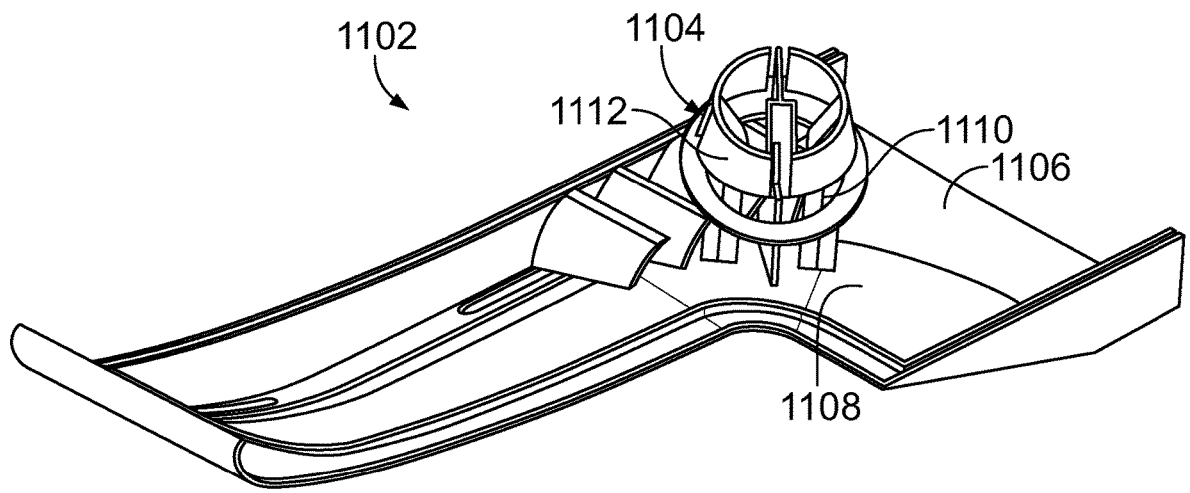
FIG. 44 is a perspective view of an outflow vent according to another embodiment.
Figure 45:
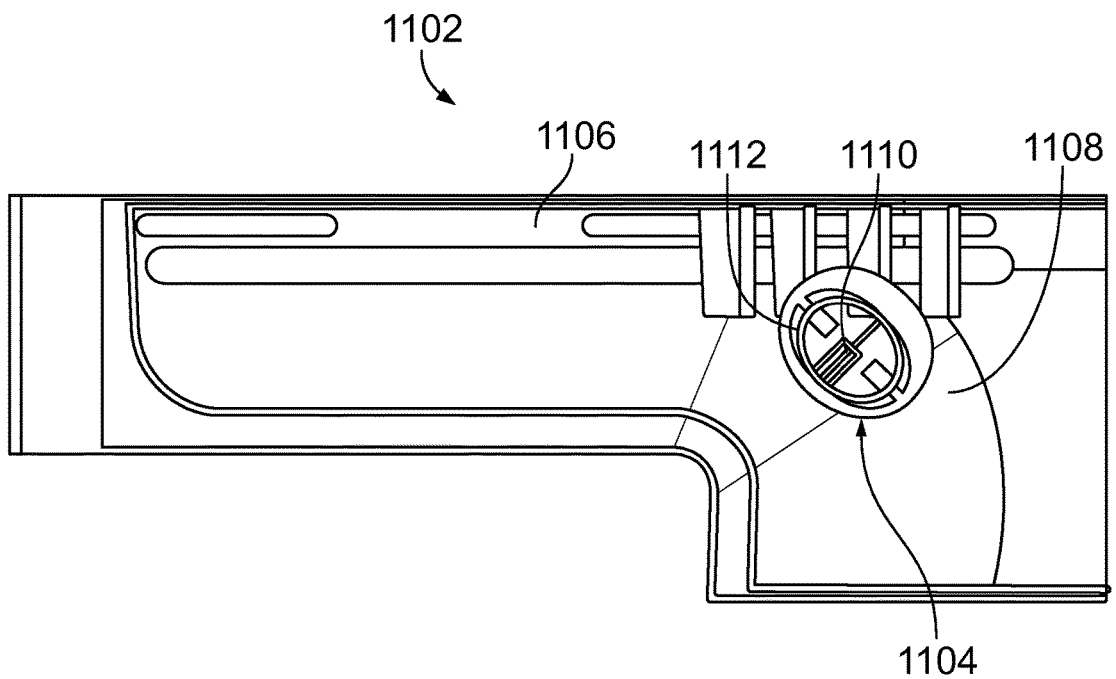
FIG. 45 is a plan view showing an interior of the outflow vent of FIG. 44.
Figure 46:
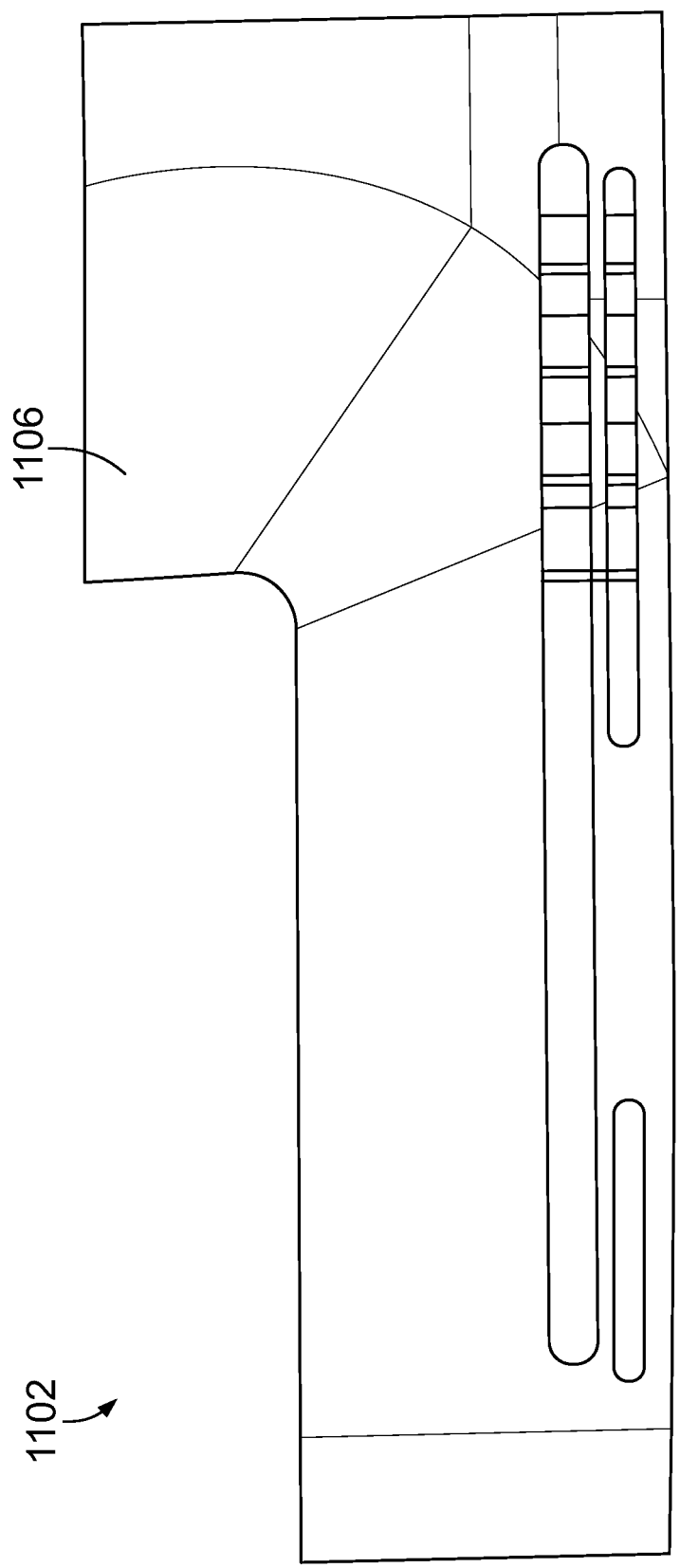
FIG. 46 is a plan view showing an exterior of the outflow vent of FIG. 44.

FIG. 44 is a perspective view of an outflow vent 1102 according to another embodiment. FIG. 45 is a plan view showing an interior of the outflow vent 1102 of FIG. 44. FIG. 46 is a plan view showing an exterior of the outflow vent 1102 of FIG. 44. The outflow vent 1102 may be substantially similar to the outflow vent 1002 shown in FIGS. 34 through 43. The outflow vent 1102 has an attachment unit 1104 that differs from the attachment unit 1018 of the outflow vent 1002. The outflow vent 1102 represents a one-piece embodiment in which the attachment unit 1104 is integrally connected to the cap 1106 of the outflow vent 1102 to define a unitary, monolithic body. For example, the attachment unit 1104 may be mounted to an interior surface 1108 of the cap 1106 at a seamless interface via welding, casting, molding, additive manufacturing, or the like. Furthermore, the attachment unit 1104 optionally only has one frame 1110 in the illustrated embodiment. The frame 1110 has at least one deflectable mounting latch 1112 for releasably securing the outflow vent 1102 to a vent housing.

Figure 47:
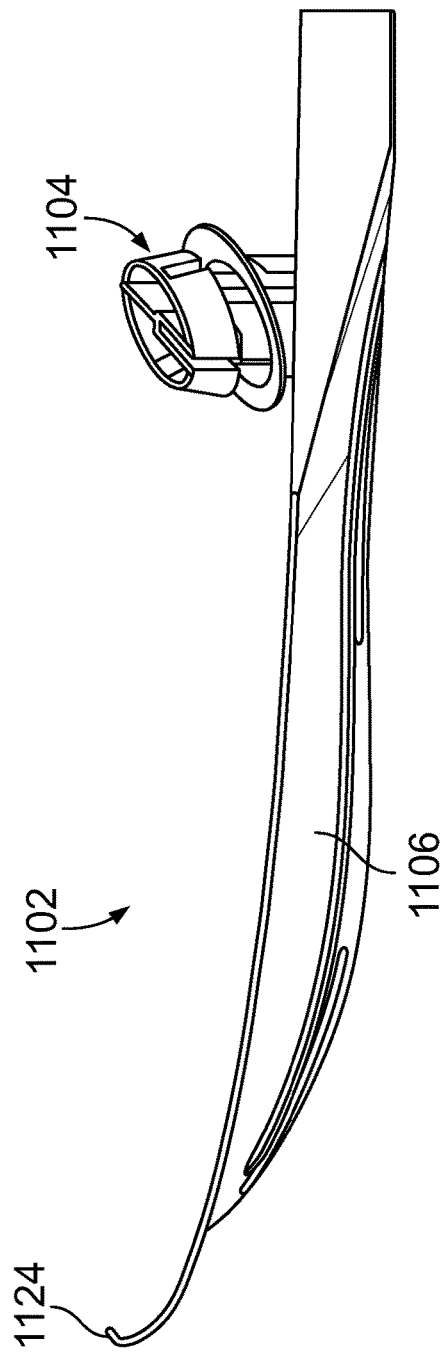
FIG. 47 is a first side elevational view of the outflow vent shown in FIG. 44.
Figure 48:
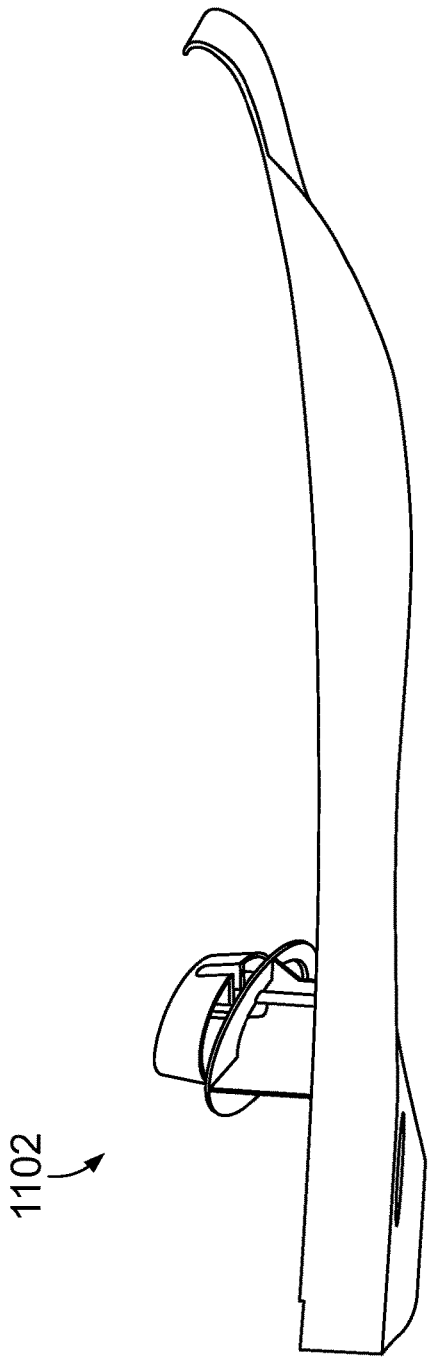
FIG. 48 is a second side elevational view of the outflow vent shown in FIG. 44.
Figure 49:
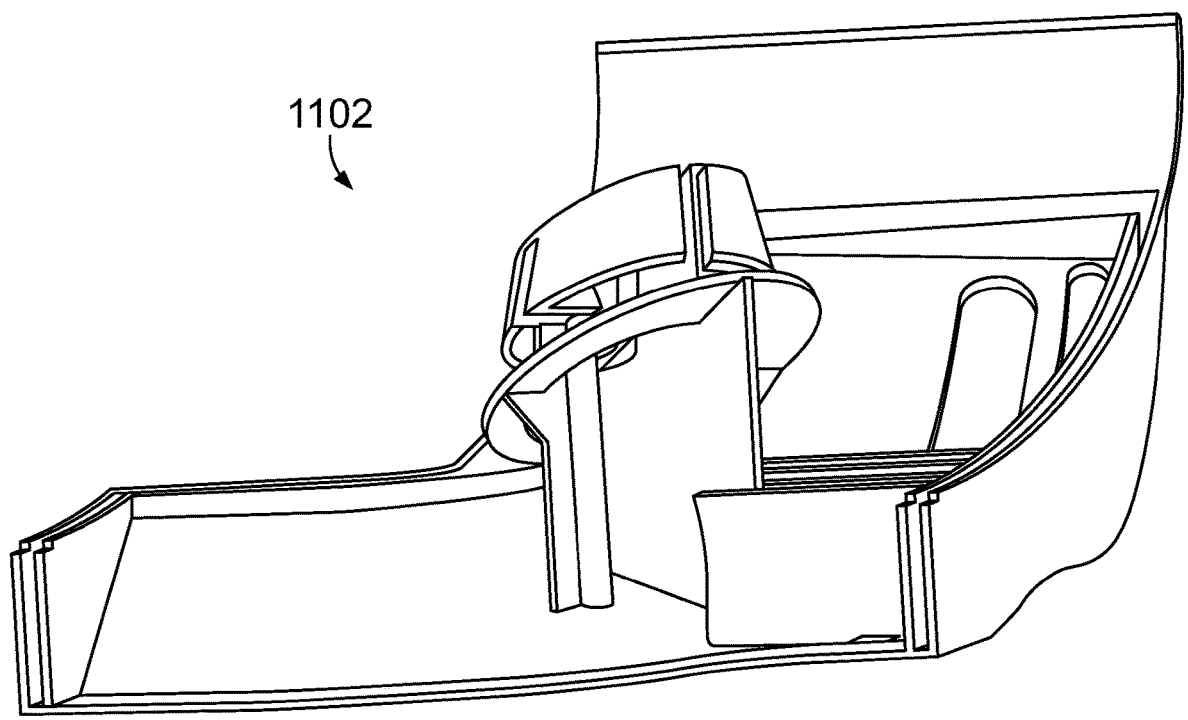
FIG. 49 is a first end elevational view of the outflow vent of FIG. 44.
Figure 50:
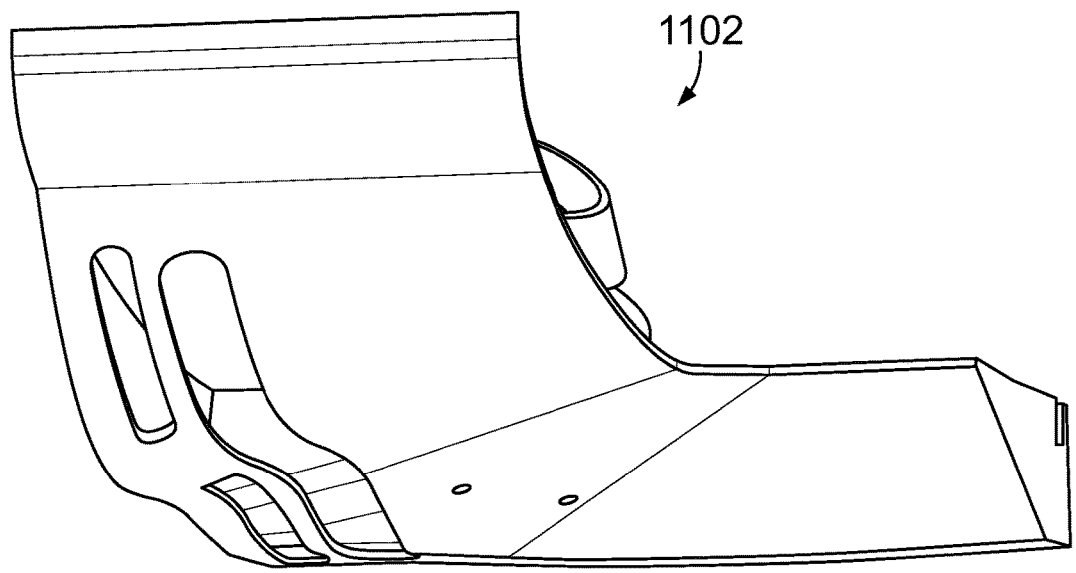
FIG. 50 is a second end elevational view of the outflow vent of FIG. 44

FIG. 47 is a first side elevational view of the outflow vent 1102 of FIG. 44. FIG. 48 is a second side elevational view of the outflow vent 1102 of FIG. 44. The illustrated side shown in FIG. 48 is opposite the side shown in FIG. 47. FIG. 49 is a first end elevational view of the outflow vent 1102 of FIG. 44. FIG. 50 is a second end elevational view of the outflow vent 1102 of FIG. 44. The illustrated end shown in FIG. 49 is opposite the end shown in FIG. 50.

Figure 51:
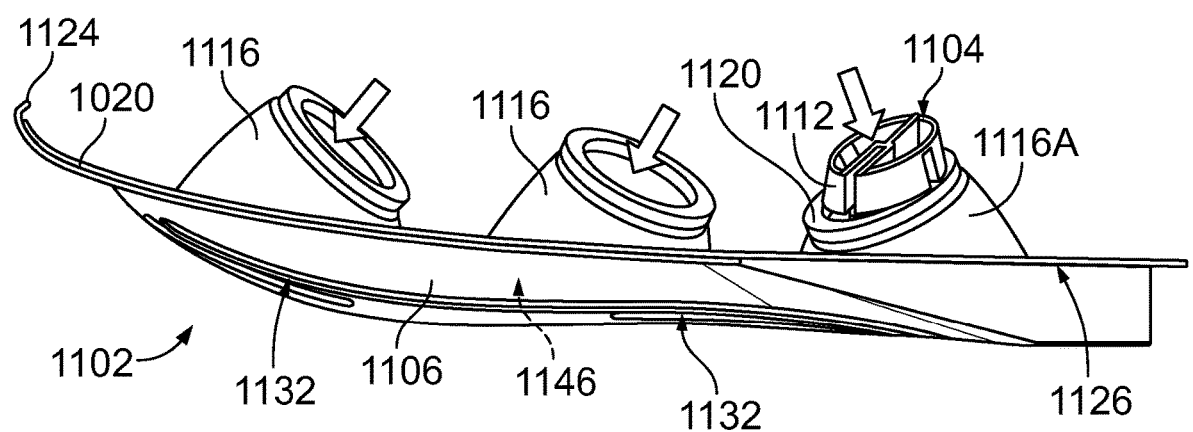
FIG. 51 is a first side elevational view of the outflow vent, as shown in FIG. 47, mounted to the panel according to an embodiment.

FIG. 51 is a first side elevational view of the outflow vent 1102, as shown in FIG. 47, mounted to the panel 1020 according to an embodiment. In the illustrated embodiment, the cap 1106 covers multiple outlet openings or PAOs, each defined by a respective vent housing 1116. The vent housings 1116 are coupled, directly or indirectly, to the panel 1020. The attachment unit 1104 of the outflow vent 1102 aligns with and enters one of the vent housings 1116A when the cap 1106 is pushed upward into engagement with the panel 1020. Eventually, the at least one deflectable mounting latch 1112 of the attachment unit 1104 passed beyond an edge 1120 or lip of the vent housing 1116A and catches on the edge 1120. When secured in place via the attachment unit 1104, the hook 1124, and/or a connection to the rail 1004, the cap 1106 may seal to the panel 1020 at the interface 1126.

In the illustrated embodiment, air may be directed into the cavity 1146 of the cap 1106 through the outlet openings of the vent housings 1116. The air received from the vent housings 1116 may combine with the airflow received from the rail 1004. The air curtain emitted through the at least one slot 1132 of the outflow vent 1102 may be formed of the combined air stream.

Figure 52:
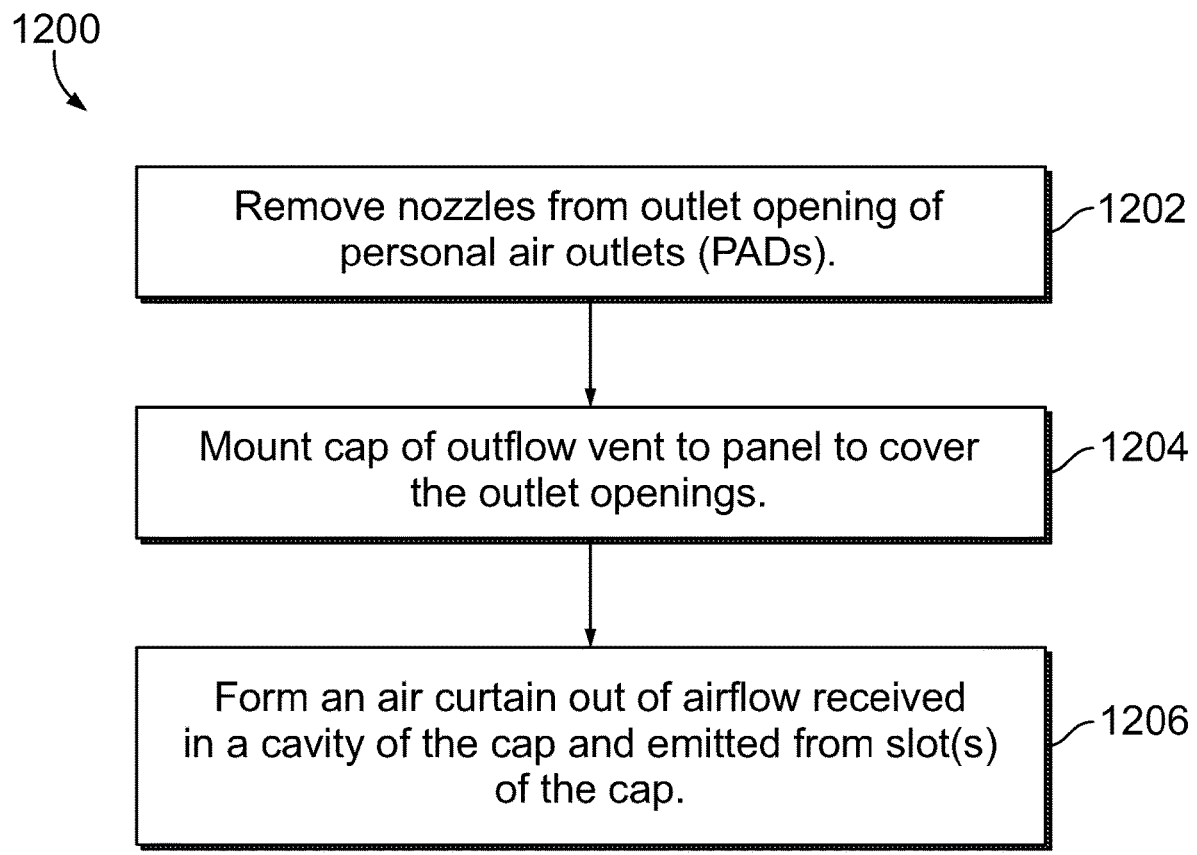
FIG. 52 is a flow chart of a method for providing an air curtain according to an embodiment.

FIG. 52 is a flow chart 1200 of a method for providing an air curtain according to an embodiment. The method may be a retrofitting process. The method may include more steps, fewer steps, and/or different steps than shown in the flow chart 1200. The method includes, at 1202, removing nozzles from outlet openings within an internal cabin of a vehicle. The outlet openings may be located disposed above a row of seats. The nozzles may be gaspers (e.g., PAOs).

At 1204, a cap of an outflow vent is mounted to a panel of the internal cabin such that the cap covers the outlet openings. The cap is mounted subsequent to removing the nozzles from the outlet openings. The cap may be overlaid on the panel and disposed to cover at least two of the outlet openings. The cap includes a base wall that defines at least one slot therethrough.

At 1206, airflow is emitted through the at least one slot of the cap to form an air curtain. The airflow that is used to form the air curtain may be air received into the cavity through the inlet opening and/or air received from the outlet openings. For example, airflow received from the rail through the inlet opening may combine with airflow received from the outlet openings, within the cavity, prior to being emitted through the at least one slot as the air curtain.

The air curtain may be associated with a row of seats to provide a continuous sheet of air that intercepts airborne pathogen transmission for passengers seated in the row of seats. Optionally, the cap may be formed and/or mounted to the panel such that the air curtain is provided at a location in front of the heads of passengers seated in the row of seats. For example, the at least one slot of the cap may be positioned in front of the row of seats along a longitudinal axis of the internal cabin. By providing the air curtain in front of the heads of the passengers, the air curtain may not interfere with or distract the passenger. Optionally, the at least one slot defines an air curtain axis that is generally parallel to a row axis of the row of seats.

The cap may have a three-dimensional shape that defines a cavity between the panel and a base wall of the cap. The cap may be elongated from a first end of the cap to a second end of the cap opposite the first end. The first end of the cap may define an inlet opening to receive airflow generated by an airflow generator into the cavity. The mounting of the cap to the panel may include mounting the first end of the cap to a rail. The rail defines a channel that conveys airflow generated by the airflow generator along a length of the internal cabin. The first end of the cap is mounted to the rail to establish a fluid connection between the channel and the cavity of the cap through the inlet opening.

Mounting the cap to the panel may include catching a hook at a second end of the cap onto an edge of the panel. The mounting my include inserting an attachment unit of the cap into one of the outlet openings. The attachment unit is mounted to an interior surface of the cap. The attachment unit may be releasably coupled to the cap via one or more deflectable coupling latches, fasteners, or the like. As such, the method may include coupling the attachment unit to the cap. In an alternative embodiment, the attachment unit is integrally connected to the cap such that the cap and the attachment unit define a unitary, monolithic body. The attachment unit includes a frame and a deflectable mounting latch on the frame. The frame extends into the outlet opening defined by a vent housing, and the deflectable mounting latch catches on the vent housing to secure the cap to the panel.

As described herein, the air curtain systems and methods are configured to provide air curtains that inhibit the spread of pathogens between people within an enclosed room or cabin, such as an internal cabin of an aircraft or another type of passenger vehicle during a trip.

Clause 1: A system comprising:
an outflow vent including a cap releasably mounted to a panel within an internal cabin of a vehicle, the cap being elongated from a first end of the cap to a second end of the cap opposite the first end, the cap having a base wall that is overlaid on the panel and defines at least one slot therethrough, wherein the cap receives an airflow generated by an airflow generator, and the at least one slot emits the airflow from the cap to form an air curtain within the internal cabin.

Clause 2. The system of Clause 1, wherein the cap has a three-dimensional shape and defines a cavity between the panel and the base wall, the first end of the cap defining an inlet opening to receive the airflow into the cavity prior to being emitted from the cap through the at least one slot to form the air curtain.

Clause 3. The system of Clause 2, further comprising a rail that defines a channel, wherein the rail is coupled to the first end of the cap and the channel is fluidly connected to the inlet opening of the cap to supply the airflow into the cavity of the cap.

Clause 4. The system of Clause 3, wherein the rail is disposed at an outboard wall of the internal cabin and is elongated to extend along a length of the internal cabin.

Clause 5. The system of Clause 3, wherein the outflow vent is a first outflow vent, and the system comprises a second outflow vent including a second cap coupled to the rail at a location that is spaced apart from the cap of the first outflow vent, the second outflow vent configured to emit airflow received from the channel of the rail through at least one slot of the second cap to form a second air curtain within the internal cabin.

Clause 6. The system of Clause 2, wherein the panel is a component of a personal service unit (PSU) of an aircraft, the PSU including multiple outlet openings through which air is emitted from the PSU, wherein the cap mounted onto the panel covers at least two of the outlet openings such that the air emitted from the at least two outlet openings is received into the cavity of the cap and combines with the airflow received through the inlet opening at the first end of the cap.

Clause 7. The system of any of Clauses 1-6, wherein the cap is located above a row of seats within the internal cabin, and the at least one slot of the cap is positioned in front of the row of seats along a longitudinal axis of the internal cabin.

Clause 8. The system of any of Clauses 1-7, wherein the outflow vent includes at least one vane mounted to an interior surface of the cap and angled relative to the interior surface to direct the airflow towards the at least one slot.

Clause 9. The system of any of Clauses 1-8, wherein the outflow vent has a compressible seal along a top edge of the cap, the compressible seal configured to be compressed at an interface between the cap and the panel to seal the interface.

Clause 10. The system of any of Clauses 1-9, wherein the second end of the cap has a hook configured to catch on an edge of the panel.

Clause 11. The system of any of Clauses 1-10, wherein the cap is located above a row of seats within the internal cabin, and at least one slot defines an air curtain axis that is generally parallel to a row axis of the row of seats.

Clause 12. The system of any of Clauses 1-11, wherein the outflow vent further comprises an attachment unit mounted to an interior surface of the cap, the attachment unit including a frame and a deflectable mounting latch on the frame, the frame configured to extend into an outlet opening defined by a vent housing connected to the panel, the deflectable mounting latch configured to catch on the vent housing to secure the cap to the panel.

Clause 13. The system of Clause 12, wherein the attachment unit is releasably coupled to the cap via one or more deflectable coupling latches.

Clause 14. The system of Clause 12, wherein the attachment unit is integrally connected to the cap such that the cap and the attachment unit define a unitary, monolithic body.

Clause 15. A vehicle comprising:
an internal cabin including a row of seats and a panel disposed above the row of seats; and
an air curtain system within the internal cabin, the air curtain system comprising an outflow vent including a cap releasably mounted to the panel above the row of seats, the cap having a base wall that is overlaid on the panel and defines at least one slot therethrough, wherein the cap receives an airflow generated by an airflow generator, and the at least one slot emits the airflow from the cap to form an air curtain associated with the row of seats below.

Clause 16. The vehicle of Clause 15, wherein the cap defines a cavity between the panel and the base wall, a first end of the cap defining an inlet opening, and the air curtain system further comprises a rail that defines a channel through which the airflow is directed from the airflow generator, wherein the rail is coupled to the first end of the cap and the channel is fluidly connected to the inlet opening to supply the airflow into the cavity of the cap prior to the airflow being emitted from the cap through the at least one slot to form the air curtain.

Clause 17. The vehicle of Clause 15 or Clause 16, wherein the at least one slot defines an air curtain axis that is generally parallel to a row axis of the row of seats, and the at least one slot is positioned in front of the row of seats along a longitudinal axis of the internal cabin.

Clause 18. The vehicle of any of Clauses 15-17, wherein the cap defines a cavity between the panel and the base wall, and the panel is a component of a personal service unit (PSU) of an aircraft, the PSU including multiple outlet openings through which air is emitted from the PSU, wherein the cap mounted onto the panel covers at least two of the outlet openings such that the air emitted from the at least two outlet openings is received into the cavity of the cap and combines prior to being emitted from the cap through the at least one slot to form the air curtain.

Clause 19. The vehicle of any of Clauses 15-18, further comprising an attachment unit mounted to an interior surface of the cap, the attachment unit including a frame and a deflectable mounting latch on the frame, the frame configured to extend into an outlet opening defined by a vent housing connected to the panel, the deflectable mounting latch configured to catch on the vent housing to secure the cap to the panel.

Clause 20. A system comprising:
a rail operatively connected to an airflow generator of a vehicle, the rail defining a channel that conveys airflow from the airflow generator; and an outflow vent including a cap releasably mounted to a panel within the vehicle, the cap having a base wall that is overlaid on the panel and defines at least one slot therethrough, the cap defining a cavity between the panel and the base wall, wherein a first end of the cap defines an inlet opening and the first end is coupled to the rail such that the inlet opening is fluidly connected to the channel of the rail, wherein the cap receives the airflow from the rail within the cavity, and the cap emits the airflow through the at least one slot to form an air curtain within the internal cabin.

Clause 21. The system of Clause 20, wherein the panel is a component of a personal service unit (PSU) of the vehicle, the PSU including multiple outlet openings through which air is emitted from the PSU, wherein the cap mounted onto the panel covers at least two of the outlet openings such that the air emitted from the at least two outlet openings is received into the cavity of the cap and combines with the airflow received from the rail through the inlet opening at the first end of the cap prior to being emitted through the at least one slot to form the air curtain.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

As used herein, approximating value modifiers such as "about," "substantially," "generally," and "approximately" inserted before a numerical value indicate that the value can represent other values within a designated threshold range above and/or below the specified value without resulting in a change in the basic function to which it may be related. Accordingly, a value modified by a term or terms, such as "about," "substantially," "generally," and "approximately," may be not to be limited to the precise value specified. The approximating terms may indicate inclusion of values within a designated threshold margin of the precise value. The threshold margin may be plus/minus 3% of the precise value, plus/minus 5% of the precise value, plus/minus 10% of the precise value, or the like. Two items or axes that are generally parallel can be angled within 3 degrees of each other in one example, within 5 degrees of each other in a second example, and within 10 degrees of each other in a third example.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
an outflow vent including a cap releasably mounted to a panel within an internal cabin of a vehicle, the cap having a base wall that is overlaid on the panel and defines a cavity between the panel and the base wall, the base wall defining at least one slot therethrough, the base wall extending from a first end of the cap to a second end of the cap opposite the first end, the first end defining an inlet opening to the cavity and configured to be coupled to a rail so that the inlet opening is fluidly connected to a channel defined by the rail, wherein the cap is configured to receive airflow from the rail into the cavity via the inlet opening and to emit the airflow from the cavity through the at least one slot in the base wall to form an air curtain within the internal cabin.

2. The system of claim 1, wherein the rail is disposed at an outboard wall of the internal cabin and is elongated to extend along a length of the internal cabin.

3. The system of claim 1, wherein the outflow vent is a first outflow vent, and the system comprises a second outflow vent including a second cap coupled to the rail at a location that is spaced apart from the cap of the first outflow vent, the second outflow vent configured to emit airflow received from the channel of the rail through at least one slot of the second cap to form a second air curtain within the internal cabin.

4. The system of claim 1, wherein the panel is a component of a personal service unit (PSU) of an aircraft, the PSU including multiple outlet openings through which air is emitted from the PSU, wherein the cap mounted onto the panel covers at least a first outlet opening of the outlet openings such that the air emitted from the first outlet opening is received into the cavity of the cap and combines with the airflow received through the inlet opening at the first end of the cap.

5. The system of claim 1, wherein the cap is located above a row of seats within the internal cabin, and the at least one slot of the cap is positioned in front of the row of seats along a longitudinal axis of the internal cabin.

6. The system of claim 1, wherein the outflow vent includes at least one vane mounted to an interior surface of the cap and angled relative to the interior surface to direct the airflow towards the at least one slot.

7. The system of claim 1, wherein the outflow vent has a compressible seal along a top edge of the cap, the compressible seal configured to be compressed at an interface between the cap and the panel to seal the interface.

8. The system of claim 1, wherein the second end of the cap has a hook configured to catch on an edge of the panel.

9. The system of claim 1, wherein the cap is located above a row of seats within the internal cabin, and the at least one slot defines an air curtain axis that is generally parallel to a row axis of the row of seats.

10. The system of claim 1, wherein the base wall is elongated parallel to a row axis associated with row of seats within the internal cabin so that the first end of the cap is an outboard end and the second end of the cap is an inboard end.

11. The system of claim 1, wherein the at least one slot through the base wall includes a first slot that is elongated parallel to row axis associated with row of seats within the internal cabin.

12. A system comprising:
an outflow vent comprising a cap and an attachment unit, the cap releasably mounted to a panel within an internal cabin of a vehicle, the cap having a base wall that is overlaid on the panel and defines at least one slot therethrough,
wherein the attachment unit is mounted to an interior surface of the cap and includes a frame that has a deflectable mounting latch, the frame configured to extend into an outlet opening defined by a vent housing connected to the panel, the deflectable mounting latch configured to catch on the vent housing to secure the outflow vent to the panel,
wherein the cap is configured to receive airflow and to emit the airflow through the at least one slot to form an air curtain within the internal cabin.

13. The system of claim 12, wherein the attachment unit is releasably coupled to the cap via one or more deflectable coupling latches.

14. The system of claim 12, wherein the attachment unit is integrally connected to the cap such that the cap and the attachment unit define a unitary, monolithic body.

15. The system of claim 12, wherein the base wall defines a cavity between the base wall and the panel, wherein a first end of the cap defines an inlet opening to the cavity and the first end is configured to be coupled to a rail within the internal cabin so that the inlet opening is fluidly connected to a channel defined by the rail, wherein the cap is configured to receive airflow from the rail into the cavity via the inlet opening and emits the airflow through the at least one slot in the base wall to form an air curtain within the internal cabin.

16. The system of claim 15, wherein the rail is disposed at an outboard wall of the internal cabin and the first end of the cap that couples to the rail is an outboard end of the cap, the cavity extending in an inboard direction from the inlet opening.

17. The system of claim 12, wherein the panel is a component of a personal service unit (PSU) of an aircraft, the outlet opening through which the frame of the attachment unit extends is a first outlet opening of multiple outlet openings of the PSU that emit air into the internal cabin.

18. A vehicle comprising:
   an internal cabin including a row of seats and a personal service unit (PSU) disposed above the row of seats, the PSU including a panel and multiple outlet openings through which air is emitted from the PSU; and
   an air curtain system within the internal cabin, the air curtain system comprising an outflow vent including a cap releasably mounted to the panel above the row of seats, the cap having a base wall that is overlaid on the panel and defines a cavity between the panel and the base wall, the base wall defining at least one slot therethrough, wherein the cap mounted to the panel covers at least two of the outlet openings so that the air emitted from the at least two outlet openings is received into the cavity of the cap before being emitted from the cap through the at least one slot to form an air curtain associated with the row of seats below.

19. The vehicle of claim 18, wherein a first end of the cap defines an inlet opening, and
   the air curtain system further comprises a rail that that defines a channel through which airflow is directed from a ventilation system of the vehicle, wherein the rail is coupled to the first end of the cap and the channel is fluidly connected to the inlet opening to supply the airflow into the cavity of the cap prior to the airflow being emitted from the cap through the at least one slot to form the air curtain.

20. The vehicle of claim 18, wherein the at least one slot defines an air curtain axis that is generally parallel to a row axis of the row of seats, and the at least one slot is positioned in front of the row of seats along a longitudinal axis of the internal cabin.

* * * * *